(12) United States Patent
Dube et al.

(10) Patent No.: US 9,051,496 B2
(45) Date of Patent: Jun. 9, 2015

(54) METHODS FOR MAKING ADHESIVES

(75) Inventors: Marc A. Dube, Ottawa (CA); Lili Qie, Woodbury, MN (US)

(73) Assignee: UNIVERSITY OF OTTAWA, Ottawa (CA)

( * ) Notice: Subject to any disclaimer, the term of this patent is extended or adjusted under 35 U.S.C. 154(b) by 703 days.

(21) Appl. No.: 13/262,886

(22) PCT Filed: Feb. 23, 2011

(86) PCT No.: PCT/US2011/025968
§ 371 (c)(1),
(2), (4) Date: Oct. 4, 2011

(87) PCT Pub. No.: WO2012/115642
PCT Pub. Date: Aug. 30, 2012

(65) Prior Publication Data
US 2012/0214937 A1    Aug. 23, 2012

(51) Int. Cl.
*C08F 220/20* (2006.01)
*C08F 220/06* (2006.01)
*C09J 133/06* (2006.01)

(52) U.S. Cl.
CPC .................. *C09J 133/066* (2013.01)

(58) Field of Classification Search
CPC .................. C08F 220/06; C08F 220/20; C08F 2220/1825; C09J 133/066
USPC ........................................................ 524/558
See application file for complete search history.

(56) References Cited

U.S. PATENT DOCUMENTS

| | | | |
|---|---|---|---|
| 3,706,697 | A | 12/1972 | Backderf |
| 4,077,926 | A | 3/1978 | Sanderson et al. |
| 4,322,516 | A | 3/1982 | Wiest et al. |
| 4,474,923 | A | 10/1984 | Keskey et al. |
| 4,923,919 | A | 5/1990 | Frazee |
| 5,278,227 | A | 1/1994 | Bernard |
| 5,362,816 | A | 11/1994 | Snyder et al. |
| 5,416,134 | A | 5/1995 | Skoglund |
| 6,281,298 | B1 | 8/2001 | Papsin, Jr. |
| 6,541,566 | B1 | 4/2003 | Farwaha et al. |
| 6,608,134 | B1 * | 8/2003 | Tobing et al. ................. 524/501 |
| 6,972,311 | B2 | 12/2005 | Chevillard et al. |
| 7,521,487 | B2 | 4/2009 | Hansen et al. |
| 7,645,827 | B2 | 1/2010 | Lewandowski et al. |
| 7,652,095 | B2 | 1/2010 | Filiatrault et al. |
| 7,652,103 | B2 | 1/2010 | Kavanagh et al. |
| 7,714,076 | B2 | 5/2010 | Krepski et al. |
| 7,763,337 | B2 | 7/2010 | Paiva et al. |
| 2008/0023132 | A1 | 1/2008 | Sano et al. |
| 2010/0124627 | A1 | 5/2010 | Nonaka et al. |

FOREIGN PATENT DOCUMENTS

| | | |
|---|---|---|
| EP | 1 218 446 | 7/2002 |
| JP | 2003-013027 | 1/2003 |
| KR | WO2007/061242 * | 5/2007 |
| WO | WO-00/68316 | 11/2000 |
| WO | WO-2007/061242 | 5/2007 |
| WO | WO-2009/066883 | 5/2009 |

OTHER PUBLICATIONS

Notice of Allowance in U.S. Appl. No. 13/033,547 dtd May 28, 2013.
Agirre, A. et al., "Miniemulsion Polymerization of 2-Ethylhexyl Acrylate. Polymer Architecture Control and Adhesion Properties," Macromolecules, 2010, vol. 43, pp. 8924-8932.
Agirre, A. et al., "Waterborne, Semicrystalline, Pressure-Sensitive Adhesives with Temperature-Responsiveness and Optimum Properties," ACS Appl Mater Interfaces, Published on Web Jan. 14, 2010, vol. 2, No. 2, pp. 443-451.
Benedek, I., "Chapter 2—Rheology of Pressure-Sensitive Adhesives," Pressure-Sensitive Adhesive and Applications, CRC Press, Marcel Dekker Inc., Feb. 3, 2004, pp. 5-88.
Benedek, I., "Chapter 3—Physical Basis for the Viscoelastic Behavior of Pressure-Sensitive Adhesives," Pressure-Sensitive Adhesive and Applications, CRC Press, Marcel Dekker Inc., Feb. 3, 2004, pp. 89-145.
Deplace, F. et al., "Fine Tuning the Adhesive Properties of a Soft Nanostructured Adhesive with Rheological Measurements," J. Adhesion, 2009, vol. 85, pp. 18-54.
Eckersley, S.T. et al.,"The film formation of acrylic latexes: A comprehensive model of film coalescence," Journal of Applied Polymer Science, Aug. 29, 1994, vol. 53, No. 9, pp. 1139-1147.
Elizalde, O. et al., "Control of adhesive properties of n-BA/Sty latexes," Polym. React. Eng., 2002, vol. 10, No. 4, pp. 265-283.
Elizalde, O. et al., "Knowledge-based control of emulsion polymerization: Tailoring adhesive properties," J. of Coatings Technology and Research, Jan. 2004, vol. 1, No. 1, pp. 45-51.
Flanigan, C.M. et al., "Structural Development and Adhesion of Acrylic ABA Triblock Copolymer Gels," Macromolecules, 1999, vol. 32, No. 21, pp. 7251-7262.
Foster, A.B. et al., "Control of adhesive properties through structured particle design of water-borne pressure-sensitive adhesives," Polymer, Mar. 20, 2009, vol. 50, No. 7, pp. 1654-1670.
Gower, M.D. et al., "Acrylic acid level and adhesive performance and peel master-curves of acrylic pressure-sensitive adhesives," J. Polym. Sci., Part B: Polym. Phys., 2006, vol. 44, No. 8, pp. 1237-1252.
Gower, M.D. et al., "Comparison of styrene with methyl methacrylate copolymers on the adhesive performance and peeling master curves of acrylate pressure sensitive adhesives," Macromol. Chem. Phys., 2005, vol. 206, No. 10, pp. 1015-1027.
Gower, M.D. et al., "The effect of chain transfer agent level on adhesive performance and peel master-curves for acrylic pressure sensitive adhesives," Macromolecular Chemistry and Physics, 2004, vol. 205, No. 16, pp. 2139-2150.

(Continued)

*Primary Examiner* — Liam J Heincer
*Assistant Examiner* — Marilou Lacap
(74) *Attorney, Agent, or Firm* — Foley & Lardner LLP

(57) ABSTRACT

Methods of preparing latex-based adhesives are provided. Such methods include aging and heating of latex-films to improve performance properties with respect to tack, peel strength, and sheer strength. The latex adhesives may be used as pressure sensitive adhesives.

27 Claims, 8 Drawing Sheets

(56) References Cited

OTHER PUBLICATIONS

Gower, M.D. et al., "The effect of varied monomer composition on adhesive performance and peeling master curves for acrylic pressure-sensitive adhesives," J. Appl. Polym. Sci., 2004, vol. 93, No. 6, pp. 2909-2917.
International Search Report and Written Opinion for PCT/US2011/025968 mailed Jun. 2, 2011.
Jovanovic, R. et al., "Butyl Acrylate/Methyl Methacrylate Latexes: Adhesive Properties," Macromol. Symp., 2004, vol. 206, pp. 43-56.
Jovanovic, R. et al., "Butyl Acrylate/Vinyl Acetate Emulsion-Based Pressure-Sensitive Adhesives: Empirical Modeling of Final Properties," Can. J. Chem. Eng., Jun. 2007, vol. 85, No. 3, pp. 341-349.
Jovanovic, R. et al., "Empirical Modeling of Butyl Acrylate/Vinyl Acetate/Acrylic Acid Emulsion-Based Pressure-Sensitive Adhesives," Macromol. Mat. Eng., 2004, vol. 289, No. 5, pp. 467-474.
Jovanovic, R. et al., "Emulsion-Based Pressure-Sensitive Adhesives: A Review," Macromol. Sci. Polym. Rev., 2004, vol. 44, No. 1, pp. 1-51.
Jovanovic, R. et al., "Screening Experiments for Butyl Acrylate/Vinyl Acetate Pressure-Sensitive Adhesives," Ind. Eng. Chem. Res., 2005, vol. 44, No. 17, pp. 6668-6675.
Kajtna, J. et al., "The effect of polymer molecular weight and crosslinking reactions on the adhesion properties of microsphere water-based acrylic pressure-sensitive adhesives," Int. J. Adhes. Adhes., 2009, vol. 29, No. 2, pp. 186-194.
Lakrout, H. et al., "Direct Observation of Cavitation and Fibrillation in a Probe Tack Experiment on Model Acrylic Pressure-Sensitive-Adhesives," J. Adhesion, 1999, vol. 69, pp. 307-359.
Li, L. et al., "Surface energy and adhesion studies on acrylic pressure sensitive adhesives," J. Adhes., 2001, vol. 76, No. 4, pp. 307-334.
Martin, L.L., "Adhesives Essentials: Formulating with Resin Dispersions," Adhesives and Sealants Industry, Apr. 1, 2006, printed on Jun. 16, 2011, retrieved from the internet at http://www.adhesivesmag.com/copyright/d33f319a0d05a010VgnVCM100000f932a8c0?view=print, 12 pages.
Qie, L. et al., "Manipulating Latex Polymer Microstructure Using Chain Transfer Agent and Cross-Linker to Modify PSA Performance and Viscoelasticity," Macromol. React. End., 2011, vol. 5, No. 2, pp. 117-128.
Qie, L., "Performance Improvement of Latex-based PSAs Using Polymer Microstructure Control," Unpublished PhD thesis, University of Ottawa, 2011, Ottawa, Canada, printed on Aug. 15, 2011, retrieved from the internet (http://www.ruor.uottawa.ca/en/bitstream/handle/10393/19727/Qie_Lili_2011_thesis.pdf?sequence=1), 271 pages.
Qie, L. et al., "Manipulation of chain transfer agent and cross-linker concentration to modify latex micro-structure for pressure-sensitive adhesives," Eur. Polym. J., 2010, vol. 46, No. 6, pp. 1225-1236.
Qie, L. et al., "The Influence of Butyl Acrylate/Methyl Methacrylate/2010Hydroxyl Ethyl Methacrylate Latex Properties on Pressure Sensitive Adhesive Performance," Int. J. Adhes. Adhes., Oct. 2010, vol. 30, No. 7, pp. 654-664.
Qie, L. et al., "Pressure Sensitive Adhesive Performance and Latex Properties," (Power Point),The Influence of Latex Properties on Pressure—Sensitive Adhesive Performance, 58th Can. Chem. Eng. Conf., Ottawa, ON, Oct. 19-22, 2008, 20 pages.
Qie, L., et al., Poster: PSA Performance Modification using HEMA and AA in BA/MMA Latexes, Polym. React. Eng. VII, Niagara Falls, on, May 3-8, 2009, 1 page.
Satas, D., "Chapter 1—Pressure Sensitive Adhesives and Adhesive Products in the United States," Handbook of Pressure Sensitive Adhesive Technology, Satas & Associates, 1999, pp. 1-23.
Tobing, S.D. et al., "Molecular parameters and their relation to the adhesive performance of acrylic pressure-sensitive adhesives," J. Appl. Polym. Sci., 2001, vol. 79, No. 12, pp. 2230-2244.
Tobing, S.D. et al., "Molecular parameters and their relation to the adhesive performance of emulsion acrylic pressure-sensitive adhesives. II. Effect of crosslinking," J. Appl. Polym. Sci., 2001, vol. 79, No. 14, pp. 2558-2564.
Tobing, S.D., et al., "Effect of network morphology on adhesive performance in emulsion blends of acrylic pressure sensitive adhesives," J. Appl. Polym. Sci., 2001, vol. 81, No. 9, pp. 2109-2117.
Yang, H.W.H. et al., "The role of viscoelastic properties in the design of pressure-sensitive adhesives," Trends Polym. Sci., 1997, vol. 5, No. 11, pp. 380-384.
Zosel, A. et al., "Influence of crosslinking on structure, mechanical properties, and strength of latex films," Macromol., 1993, vol. 26, No. 9, 2222-2227.
Zosel, A., "Adhesion and tack of polymers: Influence of mechanical properties and surface tensions," Colloid Polym. Sci., 1985, vol. 263, No. 7, pp. 541-553.
Zosel, A., "The effect of fibrilation on the tack of pressure sensitive adhesives," Int. J. Adhes. Adhes., 1998, vol. 18, No. 4, pp. 265-271.
International Preliminary Report on Patentability in PCT/US2011/025968 dtd Sep. 6, 2013.
Non-Final Office Action issued for U.S. Appl. No. 13/033,547 dated Mar. 20, 2013.
Mun, F.T., "Studies of triblock copolymer-tackifying resin interactions by viscoelasticity and adhesive performance," Journal of Adhesion Science and Technology, 1989, vol. 3, No. 7, pp. 551-570.
Qie, L., et al., "Influence of Polymer Microstructure of Latex-based Pressure Sensitive Adhesives on the Performance of Post-treated PSAs," Chapter 6, University of Ottawa—A thesis submitted to the Faculty of Graduate and Postdoctoral Studies, pp. 176-216 (2011), available at https://www.ruor.uottawa.ca/bitstream/10393/19727/1/Qie_Lili_2011_thesis.pdf.

* cited by examiner

METHODS FOR MAKING ADHESIVES

CROSS-REFERENCE TO RELATED APPLICATIONS

This application is a U.S. national stage application claiming the benefit of International Application No. PCT/US2011/025968, filed on Feb. 23, 2011. The application is incorporated herein by reference in its entirety.

FIELD

The present technology relates generally to adhesives and methods of making adhesives.

BACKGROUND OF THE INVENTION

The following description is provided to assist the understanding of the reader. None of the information provided or references cited is admitted to be prior art to the present invention.

Pressure sensitive adhesives (PSAs) are viscoelastic materials that can adhere to a variety of substrates. PSA performance is generally evaluated by tack, peel strength, and shear strength. Tack is a measure of how strongly a PSA can bond to a surface under a short contact time, while peel strength is a measure of how strongly a can bond to a surface by peeling it off the surface. Shear strength is a measure of the ability of a PSA to resist deformation under a shear force. Generally, an increase in shear strength for a PSA causes a corresponding decrease in tack and peel strength. This is due to the fact that in order to increase shear strength, the cohesive strength of the PSA must be increased. However, increasing the cohesive strength tends to reduce the ability of a PSA to deform and flow. Thus, the ability of a PSA to wet the substrate is attenuated and corresponding decreases in tack and peel strength are observed.

PSAs may be classified into three categories, according to their method of preparation. Solvent-based PSA films are made by casting a solution of a polymer, typically in an organic solvent. Hot melt PSA films are prepared by casting melt polymers. Latex-based PSA films are prepared by casting an aqueous latex dispersion prepared by emulsion or suspension polymerization. It is often observed that solvent-based PSAs exhibit better performance than latex-based PSAs, displaying larger shear strengths at similar tack and peel strength levels. The increased shear strengths associated with solvent-based PSAs has been attributed to their continuous gel networks. Thus, despite the environmental implications associated with solvent-based PSAs which often contain volatile organic compounds, solvent-based PSAs find continued use in high performance applications requiring large shear strengths.

SUMMARY OF THE INVENTION

The present technology provides latex-based adhesives characterized by exceptional performance properties with respect to tack, peel strength, and shear strength. Accordingly, the present adhesives are attractive alternatives to solvent-based adhesives. Such gains in cohesive and adhesive properties for the present adhesives are achieved through aging polymeric materials with unique compositions and microstructures, followed by heating, to provide adhesives with continuous gel networks. The adhesives of the present technology may be used as pressure sensitive adhesives.

In accordance with one aspect, the present technology provides a method of making an adhesive. The method includes aging a latex film including a mixture of microgels and sol polymers of an acrylic copolymer. The acrylic copolymer includes copolymerized monomers of a low $T_g$ acrylic monomer, a high $T_g$ monomer, and a hydroxyl-containing acrylic monomer. The method further includes heating the aged latex film such that the sol polymers covalently bond at least some of the microgels to each other through the sol polymers.

In another aspect, the present technology provides an adhesive prepared according to a process. The process includes aging a latex film including a mixture of microgels and sol polymers of an acrylic copolymer. The acrylic copolymer includes copolymerized monomers of a low $T_g$ acrylic monomer, a high $T_g$ monomer, and a hydroxyl-containing acrylic monomer. The process further includes heating the aged latex film such that the sol polymers covalently bond at least some of the microgels to each other through the sol polymers.

The foregoing summary is illustrative only and is not intended to be in any way limiting. In addition to the illustrative aspects, embodiments and features described above, further aspects, embodiments and features will become apparent by reference to the following drawings and the detailed description.

BRIEF DESCRIPTION OF THE DRAWINGS

FIG. 1A is an illustration of the continuous gel structure of a solvent-based PSA film. FIGS. 1B-1D illustrate the film-formation process for latex-based PSAs. FIG. 1B is an illustration of the polymer microstructure of latex particles. FIG. 1C is an illustration of the polymer microstructure of a latex-based PSA film formed from the latex particles in FIG. 1B. FIG. 1D is an illustration of the polymer microstructure obtained upon heating the latex PSA film in FIG. 1C. In FIGS. 1A, 1B, 1C, and 1D, the grids represent gel polymers and the solid dots represent cross-link points. The long curled lines represent sol polymers with a size larger than $2M_e$ which are capable of entanglement with other sol polymers or gel polymers. The short lines represent sol polymers with a size smaller than $2M_e$ which are incapable of entanglement with other sol polymers or gel polymers. The additional solid dots in FIG. 1D (in comparison to FIG. 1C) represent cross-linking points formed as a result of the heating.

FIG. 2A indicates that gel content increases with increased temperature and duration. FIGS. 2B-2D indicate shear strength, tack, and peel strength as a function of gel content (both at 120° C. and 126° C.). In FIGS. 2C-2D, "C", "A" and "C+A" refer to cohesive failure, adhesive failure, and coexisting cohesive and adhesive failure.

FIG. 6A represents illustrates 5B before heating and FIG. 6B illustrates 5B after heating.

DETAILED DESCRIPTION

Figure 1:
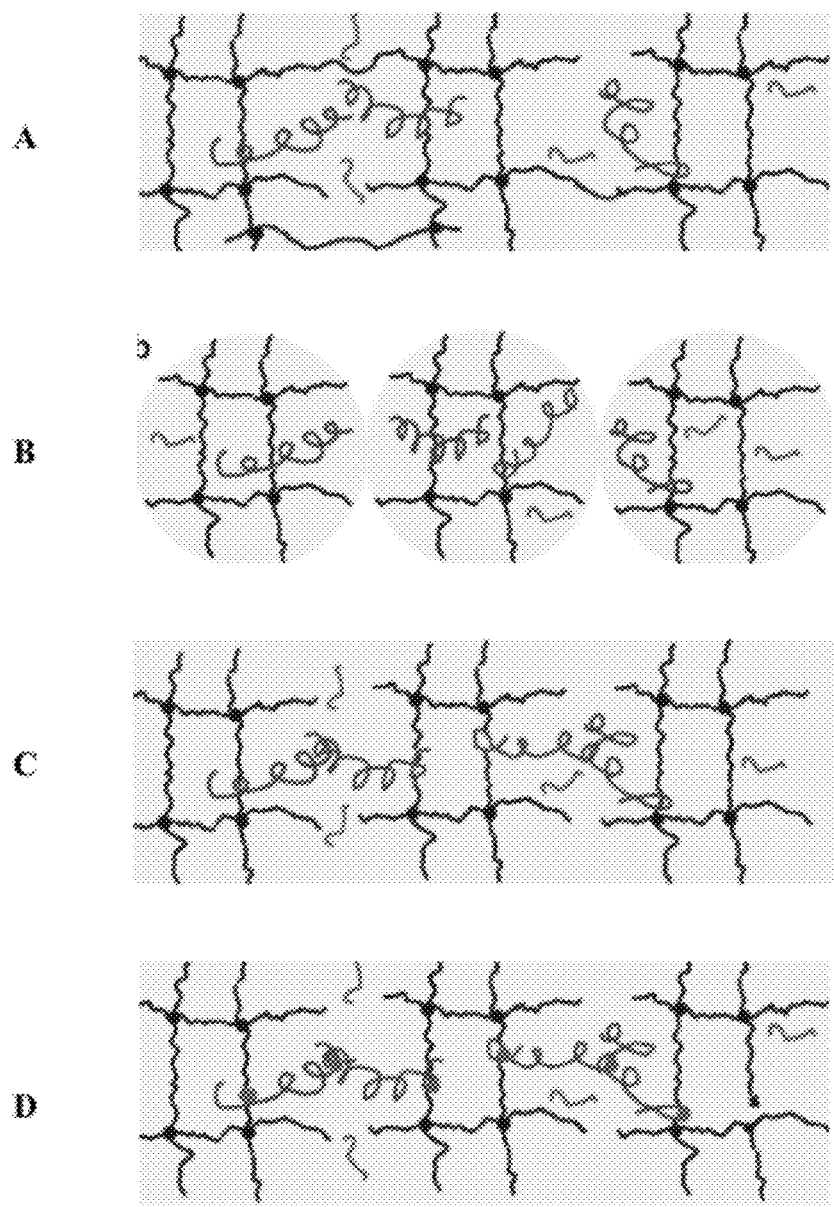
FIGS. 1A, 1B, 1C, and 1D are illustrations of the polymer microstructures of PSA films and latex.
Figure 2:
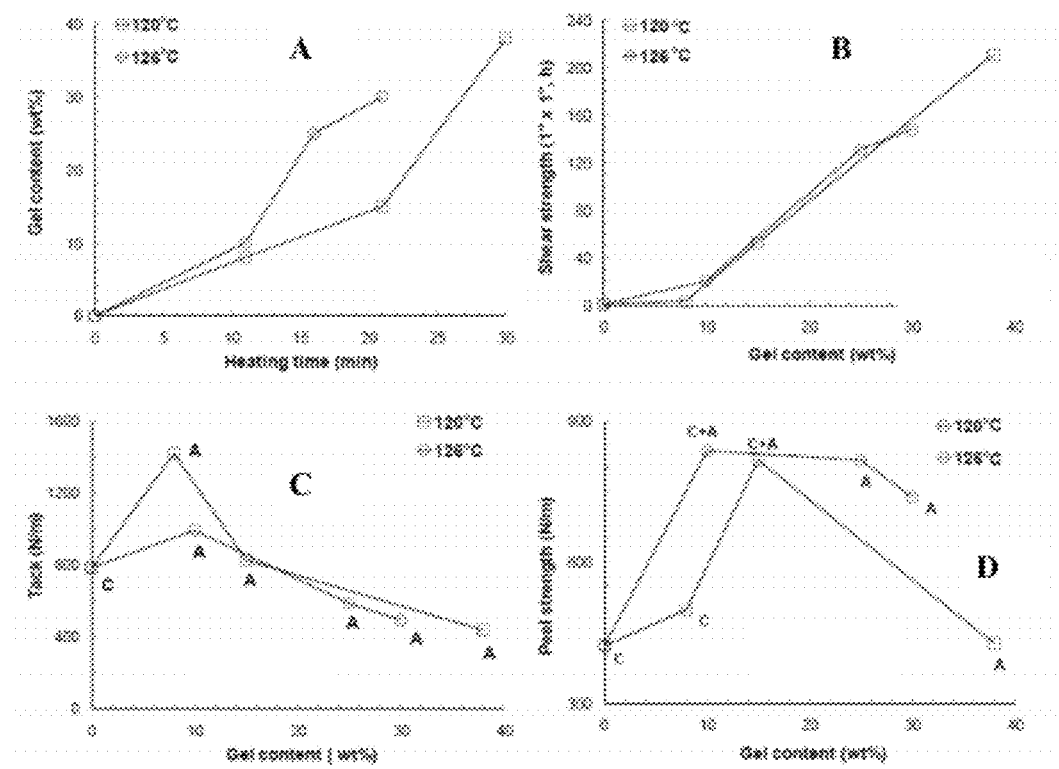
FIGS. 2A, 2B, 2C, and 2D are graphs depicting changes in polymer microstructure and performance upon heating gel-free PSA 1B.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The present technology is described herein using several definitions, as set forth throughout the specification.

As used herein, unless otherwise stated, the singular forms "a," "an," and "the" include plural reference. Thus, for example, a reference to "a cell" includes a plurality of cells, and a reference to "a molecule" is a reference to one or more molecules.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The term "acrylic monomer" means a monomer of a substituted or unsubstituted: acrylic acid, methacrylic acid, acrylate, methacrylate, or mixture thereof. Acrylates include $C_1$ to $C_{20}$ alkyl, alkenyl, aryl acrylates such as methyl acrylate, ethyl acrylate, phenyl acrylate, butyl acrylate, 2-ethylhexyl acrylate, isobornyl acrylate and functional derivatives of these acrylates such as 2-hydroxyethyl acrylate, 2-hydroxypropyl acrylate, 2-chloroethyl acrylate, allyl acrylate, and the like. Methacrylates include $C_1$ to $C_{20}$ alkyl, alkenyl, aryl or cyclic methacrylates such as methyl methacrylate, ethyl methacrylate, butyl methacrylate, 2-ethylhexyl methacrylate, phenyl methacrylate, isobornyl methacrylate, and functional derivatives of these methacrylates such as 2-hydroxyethyl methacrylate, 2-hydroxypropyl acrylate, 2-chloroethyl methacrylate, allyl methacrylate, and the like.

The term "emulsion" means a stable mixture of two or more immiscible liquids held in suspension by one or more surfactants.

The term "gel" (or "gel polymer") refers to the fraction of a polymer sample which is insoluble in tetrahydrofuran (THF) as determined according the method described in the Examples. The term "gel content" means the weight percentage of the gel (or gel polymer) in the polymer sample.

The term "high $T_g$ monomer" means an acrylic monomer or a monomer copolymerizable with an acrylic monomer, the homopolymer of which has a glass transition temperature greater than 30° C. Non-limiting examples of high $T_g$ monomers include acrylic acid, methyl methacrylate, methyl acrylate, styrene, vinyl acetate, and the like.

The term "hydroxyl-containing acrylic monomer" means an acrylic monomer containing at least one hydroxyl group which is not a carboxylic acid group. Examples of hydroxyl-containing acrylic monomers include 2-hydroxyethyl acrylate, 2-hydroxypropyl acrylate, 4-hydroxybutyl acrylate, 2-hydroxyethyl methacrylate, 2-hydroxypropyl methacrylate, 6-hydroxyhexyl methacrylate, and the like.

The term "latex" means an aqueous suspension or emulsion of a water-insoluble polymer.

The term "low $T_g$ acrylic monomer" means an acrylic monomer, the homopolymer of which has a glass transition temperature less than or equal to −20° C. Non-limiting examples of low $T_g$ acrylic monomers include butyl acrylate, 2-ethylhexyl acrylate, octyl acrylate, and the like.

The term "$M_c$" means molecular weight between adjacent cross-link points in a polymer.

The term "$M_e$" means molecular weight between adjacent entanglements in a polymer composition.

The term "$M_w$" means the weight average molecular weight of a polymer.

The term "microgel" means a polymer gel network in a latex particle with an average diameter from about 50 nm to about 500 nm. A microgel is insoluble in an organic solvent such as THF and thus may not form a gel as that term is defined herein.

The term "sol" (or "sol polymer") refers to the fraction of polymer in a polymer sample which is soluble in THF as determined according to the method described in the Examples.

The term "alkyl," by itself or as part of another substituent, means, unless otherwise stated, a fully saturated, straight, branched chain, or cyclic hydrocarbon radical, or combination thereof, and can include di- and multi-valent radicals, having the number of carbon atoms designated (e.g., $C_1$-$C_{20}$ means from one to twenty carbon atoms, inclusive). A cyclic alkyl group may also be referred to as a "cycloalkyl." In some embodiments the alkyl group has 1, 2, 3, 4, 5, 6, 7, 8, 9, 10, 11, 12, 13, 14, 15, or 16 carbons or falls in a range between and including any two of these values. In some embodiments the alkyl group is a lower alkyl group having from 1 to 6 carbon atoms. Examples of alkyl groups include, without limitation, methyl, ethyl, n-propyl, isopropyl, n-butyl, t-butyl, isobutyl, sec-butyl, cyclohexyl, (cyclohexyl)ethyl, cyclopropylmethyl, and homologs and isomers thereof, for example, n-pentyl, n-hexyl, n-heptyl, n-octyl, and the like.

The term "alkenyl" means an alkyl group as defined above containing one or more double bonds. In some embodiments the alkenyl group has 1 or 2 double bonds. Examples of alkenyl groups include but are not limited to vinyl, 2-propenyl (i.e., allyl), crotyl, 2-isopentenyl, 2-(butadienyl), 2,4-pentadienyl, 3-(1,4-pentadienyl), etc., and the higher homologs and isomers.

The term "alkynyl" means an alkyl or alkenyl group as defined above containing one or more triple bonds. Examples of alkynyl groups include ethynyl, 1- and 3-propynyl, 3-butynyl, and the like, including the higher homologs and isomers.

The term "aryl" is used herein to refer to an aromatic substituent, which may be a single aromatic ring or multiple (typically 2 or 3) aromatic rings which are fused together, linked covalently, or linked to a common group such as a diazo, methylene or ethylene moiety. The common linking group may also be a carbonyl as in benzophenone. The aromatic ring(s) may include, for example phenyl, naphthyl, biphenyl, diphenylmethyl and benzophenone, among others. The term "aryl" encompasses "arylalkyl" and "substituted aryl." For phenyl groups, the aryl ring may be mono-, di-, tri-, tetra-, or penta-substituted. Larger rings may be unsubstituted or bear one or more substituents.

"Substituted" refers to a chemical group as described herein that further includes one or more substituents, such as lower alkyl (including substituted lower alkyl such as haloalkyl, hydroxyalkyl, aminoalkyl), aryl (including substituted aryl), acyl, halogen, hydroxy, amino, alkoxy, alkylamino, acylamino, thioamide, acyloxy, aryloxy, aryloxyalkyl, carboxy, thiol, sulfide, sulfonyl, oxo, both saturated and unsaturated cyclic hydrocarbons (e.g., cycloalkyl, cycloalkenyl), and the like. These groups may be attached to any carbon or substituent of the alkyl, alkenyl, alkynyl, aryl, alkylene, alkenylene, alkynylene, or arylene groups. Additionally, the substituents may be pendent from, or integral to, the carbon chain itself.

The term "acyl" is used to describe a carbonyl-containing substituent, —C(O)R, where R is —H or substituted or unsubstituted alkyl, alkenyl, alkynyl, or aryl as defined herein.

The term "alkoxy" is used herein to refer to the —OR group, where R is monovalent or divalent alkyl, alkenyl, or alkynyl, or a substituted analog thereof. Suitable alkoxy radicals include, for example, methoxy, ethoxy, t-butoxy, etc. The term "alkoxyalkyl" refers to ether substituents, monovalent or divalent, e.g., —CH$_2$—O—CH$_3$ and —CH$_2$—O—CH$_2$—.

The term "aryloxy" is used herein to refer to —O-aryl groups where the aryl is substituted or unsubstituted as defined above and may be mono or divalent. Examples of aryloxy groups include but are not limited to phenoxy, naphthyloxy, tolyloxy, and 2-chlorophenoxy.

The term "amino" is used to designate NRR', wherein R and R' are independently H, alkyl, alkenyl, alkynyl, aryl or substituted analogs thereof. Thus, "amino" includes primary, secondary and tertiary amines, and "acylamino" describing the group RC(O)NR'.

The term "carbonyl" is used to describe a C=O substituent. "Oxo" refers to the double bonded oxygen in a carbonyl.

The term "carboxy" refers to an ester substituent or carboxylic acid, i.e., RC(O)O—, —C(O)OR, or —C(O)—OH. The R group can be a substituted or unsubstituted alkyl, alkenyl, alkynyl, or aryl group.

The term "halogen" or "halo" is used herein to refer to fluorine, bromine, chlorine and iodine atoms.

The term "hydroxy" is used herein to refer to the group —OH.

The term "sulfonate" is used herein to refer to —SO$_3$H, RSO$_2$O— or —SO$_2$OR groups. The R group can be a substituted or unsubstituted alkyl, alkenyl, alkynyl, or aryl group.

The latex-based adhesives prepared by the present technology are characterized by high peel strength, high tack, and high shear strength. Such characteristics make the adhesives described herein excellent alternatives to solvent-based adhesives. In one aspect, the adhesives of the present technology may be PSAs.

FIGS. 1A-1D illustrate the polymer microstructures of latex-based and solvent-based PSA films. As shown in FIG. 1A, a solvent-based PSA film possesses a continuous gel structure. FIGS. 1B-1D collectively illustrate the change in polymer microstructure during latex-based PSA film formation process. Referring to FIG. 1B, the preparation of a latex film begins with casting a film of an aqueous latex dispersion. The latex dispersion includes microgels and sol polymers. During the film casting process, the water in the latex particles will evaporate, and concomitantly, sol polymers of a given microgel particle will diffuse across the particle boundary to a neighboring microgel particle. If the latex polymer microstructure is tailored appropriately, i.e., the weight average molecular weight of the sol polymer ($M_w$) is larger than twice the entanglement molecular weight ($M_e$) and molecular weight between cross-links ($M_c$) is greater than or equal to $M_e$ (i.e., $M_w > 2M_e$ and $M_c \geq M_e$), then the diffused sol polymers will entangle with sol polymers or microgel polymers from another particle [1,9]. The latex particles will gradually deform, the microgel particle boundaries will disappear, and finally a latex-based PSA film is formed (FIG. 1C). From FIG. 1C, it is apparent that in latex-based PSA films, the gel is discrete, and the microgel polymers are connected together by the sol polymer chains through entanglement.

FIG. 1C illustrates a very favorable entanglement scenario and assumes the polymer microstructures have been tailored appropriately as to allow for microgel entanglement. Even under such a favorable scenario, the discrete gel microstructure of latex-based PSA films shown in FIG. 1C can result in reduced shear strengths in comparison to solvent-based PSA films. However, such reduction in shear strengths may be ameliorated through cross-linking the latex-based PSA film as to provide a more continuous gel network. In particular, the latex-based PSA may be designed as to contain functional groups, such that, upon heating, cross-linking may occur at the entanglement sites (FIG. 1D). Thus, with heating, the originally discrete gel structure becomes a more continuous gel network, resulting in improved shear strengths of latex-based PSA adhesives. However, even though a more continuous network is formed, FIG. 1D also indicates that such a network is not necessarily uniform. In particular, weak points in the heated PSA, arising from low $M_w$ sol polymers, may exist near the boundaries of the original microgels. These weak points decrease the shear strength of the adhesive. Thus, reduction of such weak points may result in further improvement shear strength in the heated PSA.

By addressing several aspects of the aforementioned latex-based film formation process, the present technology provides improved latex-based adhesives with respect not only to increased shear strengths, but also to increased tack and peel strengths. In one aspect, the present technology provides improved adhesives through polymer microstructure optimization Improved adhesives are further provided by aging of latex films used in making the adhesives. Furthermore improved adhesives are provided by heating the aged latex films.

Thus, in one aspect, methods for making adhesives are provided. The methods include aging a latex film which includes a mixture of microgels and sol polymers of an acrylic copolymer. The acrylic copolymer includes copolymerized monomers of a low $T_g$ acrylic monomer, a high $T_g$ monomer, and a hydroxyl-containing acrylic monomer. The methods further include heating the aged latex film such that the sol polymers covalently bond at least some of the microgels to each other through the sol polymers.

The acrylic copolymers used in the present technology may be prepared through emulsion polymerization of a low $T_g$ acrylic monomer, a high $T_g$ monomer, and a hydroxyl-containing acrylic monomer. The emulsion polymerization is performed using procedures known in the art, and typically employs an initiator, a surfactant, and water, in addition to the low $T_g$ acrylic monomer, the high $T_g$ monomer, the a hydroxyl-containing acrylic monomer. In an emulsion polymerization, a reaction occurs in micelles or emulsion microdrops suspended in an aqueous medium. Heat generated in the micelles or microdrops is quickly dissipated to the surrounding water phase. Thus, it is generally observed that emulsion polymerizations proceed with better control of the exothermic polymerization reaction. The emulsion polymerization may be performed as a batch, semi-continuous, or continuous polymerization. The acrylic copolymers prepared in such a fashion are obtained as a latex dispersion. The latex dispersion typically has a solids content from about 30 wt % to about 70 wt %. In one embodiment, the solids content of the latex dispersion is about 45 wt %. The pH of latex dispersion may be adjusted. Typically, the latex dispersion is adjusted to a pH of about 3 to about 7 or about 5 to about 6. From this dispersion, a latex film is cast. Thus, in one aspect, the present method includes forming the film from the latex. The latex film includes microgels and sol polymers of the acrylic copolymer.

In some embodiments of the latex of the present technology, the acrylic copolymer includes at least 90 wt % or about 90 wt % of the copolymerized low $T_g$ acrylic monomer. For example, the acrylic copolymer may include about 90 wt % to about 98 wt % of copolymerized low $T_g$ acrylic monomer. Further examples of the amount of low $T_g$ acrylic monomer include about 90 wt %, about 91 wt %, about 92 wt %, about 93 wt %, about 94 wt %, about 95 wt %, about 96 wt %, about 97 wt %, about 98 wt %, or a range between and including any two of these values. In some embodiments, the low $T_g$ acrylic monomer may selected from the group consisting of butyl acrylate, 2-ethylhexyl acrylate, methyl acrylate, octyl acrylate, sec-butyl acrylate, dodecyl methacrylate, 2-ethoxyethyl acrylate, isobutyl acrylate, 2-methoxyethyl acrylate, octyl methacrylate, and any two or more thereof. In another embodiment, the acrylic copolymer includes about 96 wt % of copolymerized low $T_g$ acrylic monomer and the low $T_g$ acrylic monomer is butyl acrylate.

In some embodiments of the latex of the present technology, the acrylic copolymer comprises at least about 1 wt % of high $T_g$ monomer. For example, the acrylic copolymer may include about 1 wt % to about 9 wt % of copolymerized high $T_g$ monomer. Further examples of the amount of copolymerized high $T_g$ monomer include about 1 wt %, about 2 wt %, about 3 wt %, about 4 wt %, about 5 wt %, about 6 wt %, about 7 wt %, about 8 wt %, about 9 wt %, or a range between and including any two of these values. In some embodiments, the high $T_g$ monomer is selected from the group consisting of methyl methacrylate, ethyl methacrylate, phenyl methacrylate, isobornyl methacrylate, methacrylic acid, acrylic acid, styrene, vinyl acetate, cyclohexyl methacrylate, isobornyl acrylate, isopropyl methacrylate, and any two or more thereof. In another embodiment, the acrylic copolymer includes about 2 wt % of copolymerized high $T_g$ monomer and the high $T_g$ monomer is acrylic acid. In another embodiment, the high $T_g$ monomer has a corresponding homopolymer with a glass transition temperature of about 80° C. to about 120° C.

In some embodiments of the latex of the present technology, the acrylic copolymer further comprises a copolymerized acrylic monomer with a glass transition temperature less than 30° C. than and greater than −20° C. In some embodiments, the amount of such acrylic monomers is at least about 1 wt %. For example, the acrylic copolymer may include about 1 wt % to about 9 wt % of such copolymerized acrylic monomer. Further examples of the amount of such copolymerized monomer include about 1 wt %, about 2 wt %, about 3 wt %, about 4 wt %, about 5 wt %, about 6 wt %, about 7 wt %, about 8 wt %, about 9 wt %, or a range between and including any two of these values.

In some embodiments of the latex of the present technology, the acrylic copolymer comprises at least about 1 wt % of copolymerized hydroxyl-containing acrylic monomer. For example, the acrylic copolymer may include about 1 wt % to about 9 wt % of copolymerized hydroxyl-containing acrylic monomer. Further examples of the amount of copolymerized hydroxyl-containing acrylic monomer include about 1 wt %, about 2 wt %, about 3 wt %, about 4 wt %, about 5 wt %, about 6 wt %, about 7 wt %, about 8 wt %, about 9 wt %, or a range between and including any two of these values. In some embodiments, the hydroxyl-containing acrylic monomer is selected from the group consisting of 2-hydroxyethyl methacrylate, 2-hydroxyethyl acrylate, 3-hydroxypropyl methacrylate, 3-hydroxypropyl acrylate, and any two or more thereof. In another embodiment, the acrylic copolymer includes about 2 wt % of copolymerized hydroxyl-containing acrylic monomer and the hydroxyl-containing acrylic monomer is 2-hydroxyethyl methacrylate.

In an illustrative embodiment, the low $T_g$ acrylic monomer is butyl acrylate, the high $T_g$ monomer is acrylic acid, and the hydroxyl-containing acrylic monomer is 2-hydroxyethyl methacrylate.

As detailed in the Examples, the gel content of the acrylic copolymer (and thus the latex film prepared therefrom) may be varied by performing the emulsion polymerization in the presence of a cross-linker, a chain transfer agent, or both. In one embodiment, the acrylic copolymer is cross-linked with a cross-linker, and the cross-linker is an acrylic monomer containing at least two carbon-carbon double bonds. The cross-linker may be allyl methacrylate, allyl acrylate, ethylene glycol diacrylate, butanediol acrylate, 1,6-hexanediol diacrylate, and mixtures of any two or more thereof. The acrylic copolymer may include about 0.1 parts per hundred parts monomer (phm) to about 1 phm of the cross-linker. In a one embodiment, the acrylic copolymer includes about 0.2 phm of allyl methacrylate cross-linker.

The acrylic copolymer or the latex film prepared therefrom may have a gel content of 0 wt % to about 85 wt %. In some embodiments, the gel content is 0 wt % to about 30 wt %, about 10 wt % to about 50 wt %, about 30 wt % to about 75 wt %, or about 50 wt % to about 85 wt %. Examples of the gel content include 0 wt %, about 10 wt %, about 20 wt %, about 30 wt %, about 40 wt %, about 50 wt %, about 60 wt %, about 70 wt %, about 75 wt %, about 80 wt %, about 85 wt %, about 90 wt %, about 95 wt %, and ranges between and including any two of these values. The acrylic copolymer or the latex film prepared therefrom may have an entanglement molecular weight ($M_e$) of about 20,000 g/mol to about 30,000 g/mol or about 21,000 g/mol to about 27,000 g/mol. The molecular weight between cross-links ($M_c$) of acrylic copolymer or the latex film therefrom may be about 10,000 g/mol to about 100,000 g/mol, about 15,000 g/mol to about 85,000 g/mol, or about 20,000 g/mol to about 60,000 g/mol.

The sol polymer of the latex film may have a $M_w$ of about 50,000 g/mol to about 750,000 g/mol. Specific examples of $M_w$ include about 50,000 g/mol, about 100,000 g/mol, about 250,000 g/mol, about 500,000 g/mol, about 750,000 g/mol, and ranges between and including any two of these values.

In one embodiment, the acrylic copolymer has a gel content greater than 0 wt %, the $M_c$ of the acrylic copolymer is greater than or equal to the $M_e$ of acrylic copolymer (i.e., $M_c \geq M_e$), the $M_w$ of the sol polymers is larger than twice the $M_e$ of acrylic copolymer but less than or equal to twenty times the $M_c$ of acrylic copolymer (i.e., $2M_c < M_w \leq 20M_c$), and the weight percentage of the sol polymers having $M_w$ less than twice the $M_e$ of the acrylic copolymer is about 10 wt % to about 50 wt %. It will be apparent to those of skill in the art, that, while $M_w$ may have a numerical value larger than $2M_e$, $M_w$ is average number and thus, a certain fraction of the sol polymers may have $M_w$ less than $2M_e$. As detailed in the Examples, in the case of gel-containing acrylate copolymers, minimization of the weight percent of low $M_w$ sol polymers (i.e., those with $M_w < 2M_e$) provides for improved entanglement of the polymer chains in the acrylic copolymer, and thus the latex film cast therefrom. An adhesive prepared from this latex film (i.e., after aging the latex film and heating the aged latex film according the present technology as presented more fully below), displays improved shear strength in comparison to a similar adhesive derived from an acrylic copolymer with a higher weight percent of low $M_w$ sol polymer. Without wishing to be bound by any particular theory, it is believed that the minimization of low $M_w$ sol polymers in the acrylic copolymer (and the latex film cast therefrom), leads to an adhesive with a more continuous gel network with an improved shear strength, similar to a solvent-based PSA.

In one embodiment, the acrylic copolymer has a gel content greater than 0 wt %, the $M_c$ of the acrylic copolymer is greater than or equal to the $M_e$ of acrylic copolymer (i.e., $M_c \geq M_e$), the $M_w$ of the sol polymers is larger than twice the $M_e$ of acrylic copolymer but less than or equal to twenty times the $M_e$ of acrylic copolymer (i.e., $2M_e < M_w \leq 20M_e$), and the weight percentage of the sol polymers having $M_w$ greater than twenty times the $M_e$ of the acrylic copolymer is about 10 wt % to about 50 wt %. It will be apparent to those of skill in the art, that, while $M_w$ may have a numerical value smaller than $20M_e$, $M_w$ is average number and thus, a certain fraction of the sol polymers may have $M_w$ greater than $20M_e$. As detailed in the Examples, in the case of gel-containing acrylate copolymers, minimization of the weight percent of high $M_w$ sol polymers (i.e., those with $M_w > 20M_e$) provides for improved entanglement of the polymer chains in acrylic copolymer, and thus the latex film cast therefrom. An adhesive prepared from this latex film (i.e., after aging the latex film and heating the aged latex film according the present technology as presented more fully below), displays improved shear strength in comparison to a similar adhesive derived from an acrylic copolymer with a higher weight percent of high $M_w$ sol polymer. Without wishing to be bound by any particular theory, it is believed that the minimization of high $M_w$ sol polymers in the acrylic copolymer (and the latex film cast therefrom), leads to an adhesive with a more continuous gel network with an improved shear strength, similar to a solvent-based PSA.

In one embodiment, the acrylic copolymer has a gel content of 0 wt % (i.e., it is gel-free), the $M_w$ of the sol polymers is larger than twice the $M_e$ of acrylic copolymer (i.e., $2M_e < M_w$), and the weight percentage of the sol polymers having an $M_w$ less than twice the $M_e$ of the acrylic copolymer is about 40 wt % to about less than 40 wt %. As detailed in the Examples, in the case of gel-free or very low gel content acrylate copolymers (e.g., gel content less than about 15 wt %), minimization of the weight percent of low $M_w$ sol polymers (i.e., those with $M_w < 2M_e$) provides for improved entanglement of the polymer chains in acrylic copolymer, and thus the latex film cast therefrom. An adhesive prepared from this latex film (i.e., after aging the latex film and heating the aged latex film according the present technology as presented more fully below), displays improved shear strength in comparison to a similar adhesive derived from an acrylic copolymer with a higher weight percent of low $M_w$ sol polymer. Without wishing to be bound by any particular theory, it is believed that the minimization of low $M_w$ sol polymers in the gel-free or very low gel content (<15 wt %) acrylic copolymer (and the latex film cast therefrom), leads to an adhesive with a more continuous gel network with an improved shear strength, similar to a solvent-based PSA.

One aspect of the present technology, includes aging the latex film prior to heating the latex film. As used herein, the term "aging" means conditioning the latex film for a time period, at a temperature, and at a humidity. Without wishing to be bound by any particular theory, it is believed that such aging results in increased entanglement of the sol polymers with the microgels or with other sol polymers. Generally, the latex film should be aged for at least one hour. In some embodiments, the latex film is aged for a time period from about 1 hour to about one week, about 1 hour to about 72 hours, about 3 hours to about 48 hours, about 6 hours to about 36 hours, about 12 hours to about 30 hours, about 18 hours to about 30 hours, or about 24 hours. It is generally desirable to age the latex film at a temperature below the temperature at which cross-linking will occur. In some embodiments, the aging step is performed at a temperature of about 20° C. to about 100° C., about 20° C. to about 80° C., about 20° C. to about 50° C., about 20° C. to about 35° C., about 40° C. to about 80° C., about 30° C. to about 40° C., or about 20° C. to about 25° C. In one embodiment, the aging step is performed at a temperature of about room temperature. The aging step may be performed at a relative humidity from about 20% to about 80%, about 40% to about 60%, or at about 50%.

In another embodiment, the process further includes removing water from the acrylic copolymer or the latex film after the aging step and prior to the heating step. Removing water from the acrylic copolymer or the latex may require warming of the acrylic copolymer or latex film. Generally, such warming will be below the temperature employed in the heating step and the warming should not cause substantial cross-linking of the acrylic copolymer or latex film. In some embodiments, warming is performed at a temperature of about 20° C. to about 100° C., about 40° C. to about 100° C., about 60° C. to about 95° C., about 70° C. to about 95° C., about 80° C. to about 95° C., or about 90° C. The duration of warming will vary depending upon the temperature employed. In some embodiments, the duration of warming is about 5 minutes to about 1 hour, about 5 minutes to about 30 minutes, about 5 minutes to about 15 minutes, or about 10 minutes. In one particular embodiment, the latex film is warmed at 90° C. for 10 minutes prior to the heating step.

The present process further includes heating the aged latex film such that the sol polymers covalently bond at least some of the microgels to each other through the sol polymers. Heating the aged latex film provides an adhesive with increased performance with respect to tack, peel strength, and shear strength in comparison to the same aged latex film which has not undergone heating. In this regard, heating the aged latex film results in the formation of cross-links between functional groups present in the microgels and the sol polymers. In one embodiment, the latex film is an acrylic copolymer of butyl acrylate, acrylic acid, and 2-hydroxyethyl methacrylate, and the cross-links are formed by reaction of the hydroxyl moiety of 2-hydroxyethyl methacrylate and the carboxylic acid groups of acrylic acid. Thus, the cross-links are ester bonds. Typically, the heating step is performed at temperature and for a time period sufficient to cause at least a portion of the functional groups involved in cross-linking to become cross-linked. Therefore, the temperature and the time period employed in the heating step can and will vary depending upon the identity of the functional groups which become cross-linked. Furthermore, the temperature and the time period for the heating step may be manipulated as to change the performance properties of the resultant adhesive (e.g., by controlling the degree of cross-linking). In general, the heating step is performed at a temperature from about 80° C. to about 150° C., about 90° C. to about 140° C., about 110° C. to about 140° C., or about 120° C. to about 130° C. The heating step is typically performed for a time period of about 1 minute to about 60 minutes, about 1 minute to about 30 minutes, about 3 minutes to about 20 minutes, about 5 minutes to about 25 minutes, or about 10 minutes to about 30 minutes.

The adhesive obtained from heating of the aged latex films generally displays an increased gel content in comparison to the aged latex film due to cross-linking. The adhesive may have gel content of about 5 wt % to about 90 wt %. The $M_c$ of the adhesive is typically from about 20,000 g/mol to about 75,000 g/mol or from about 20,000 g/mol to about 60,000 g/mol. The adhesive may further include sol polymers with a $M_w$ of about 50,000 g/mol to about 750,000 g/mol. Specific examples of $M_w$ include about 50,000 g/mol, about 100,000 g/mol, about 250,000 g/mol, about 500,000 g/mol, about 750,000 g/mol, and ranges between and including any two of these values.

Under the present process, the heating step results in increased performance of the adhesive with respect to tack, peel strength, or shear strength in comparison to an aged and unheated latex film of the same acrylic copolymer. In one embodiment, the increase in tack, peel strength, or shear strength of adhesive is at least 5% in comparison to the aged and unheated latex film of the same acrylic copolymer. In one embodiment, tack, peel strength, and shear strength of the adhesive are each increased. In another embodiment, tack and peel strength are increase about 2 times and the increase in shear strength is from about 1 hour to about 2 weeks. In one embodiment, the adhesive obtained from the heating step is a pressure sensitive adhesive.

In another aspect, the present technology provides an adhesive prepared by the process of: (i) aging a latex film including a mixture of microgels and sol polymers of an acrylic copolymer, where the acrylic copolymer includes copolymerized monomers of a low $T_g$ acrylic monomer, a high $T_g$ monomer, and a hydroxyl-containing acrylic monomer; and (ii) heating the aged latex film to form the adhesive, where the sol polymers covalently bond at least some of the microgels to each other through the sol polymers. In one embodiment, the adhesive prepared according to this process is a pressure sensitive adhesive.

The adhesives described herein may be applied to any backing which it is desired to adhere to a surface or article. Illustrative backings include flexible and rigid, natural and synthetic materials such as plastics, elastomers, polymeric films, solid metals and foils, ceramics (tiles, glass, etc.), wood, paper and cardboard, solid articles, woven and non-woven textiles (e.g., cloth), and the like. The adhesives may be applied to the backing by any one of a variety of conventional coating techniques such as roll coating, spray coating, curtain coating, and the like. Typically the adhesives presented herein may be applied to the backing in various thicknesses, often between 5-100 μm.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present technology, thus generally described, will be understood more readily by reference to the following Examples, which is provided by way of illustration and is not intended to be limiting of the present technology.

EXAMPLES

Materials, Characterization, and Testing Methods

Butyl acrylate (BA), acrylic acid (AA), 2-hydroxyl methacrylate (HEMA), and methyl methacrylate (MMA) monomers, allyl methacrylate (AMA) cross-linker, 1-dodecanethiol (N-dodecyl mercaptan, NDM or DDM), chain transfer agent (CTA), sodium dodecylsulfate (SDS) surfactant, sodium bicarbonate ($NaHCO_3$) buffer, potassium persulfate (KPS) initiator and hydroquinone (HQ) inhibitor were all obtained from Sigma-Aldrich and were used as supplied. All the above materials were reagent grade except HEMA, which had a purity of 97 wt %. Distilled deionized (DDI) water was used throughout the study. Ammonia (30 wt % in $H_2O$ for pH control) was obtained from British Drug House. All solvents used in the polymer characterization such as tetrahydrofuran (THF, HPLC grade, EMD Chemicals) and toluene (99.8%, Fisher Scientific), were also used as supplied by the manufacturer. Nitrogen gas (Linde Canada) was used to purge the reactor. PTFE porous membranes with pore size of 0.2 μm, for use in gel content measurements, were purchased from Cole-Parmer Canada.

The polymerization rate during the polymerization process was evaluated by both the instantaneous and overall monomer conversions, which were measured according to a standard gravimetric method as set forth in Reference 11, incorporated by reference herein in its entirety.

Latex particle size and size distribution (PSD) were measured with a dynamic light scattering (DLS) instrument (Malvern Nano Zetasizer). Gel content was tested with a modification of the membrane method by Tobing and Klein [11]. In particular, around 0.03 g dry polymer was weighed and sealed in a PTFE-coated membrane pouch. Then the membrane pouch was immersed into 25 mL THF in a 100 mL glass bottle. The bottle was then tightly capped and put on a shaker for 24 h. The membrane pouch was then removed and dried in a fume hood until it reached a constant weight. The weight of the remaining dry gel was taken and the gel content was calculated using:

Gel content=mass of the dry gel/mass of initial dry polymer

The THF solution remaining from the gel content test was concentrated, if necessary, and analyzed for sol polymer molecular weight, $M_w$. The solution was filtered using a 0.45 μm syringe PTFE filter (Pall Corporation) and then analyzed with a Waters Gel Permeation Chromatography (GPC) instrument equipped with a Differential Refractive Index detector, a manual injector and three Waters Styragel columns (HR6, HR4, and HR3) in series. THF was used as the eluent and the flow rate was set at 0.3 mL/min. The internal temperature was set at 37° C. The data were analyzed using Empower 2 software from Waters. The calibration curve included a set of 12 polystyrene standards (EasiCal from Polymer Laboratories) with a range of 162-6,035,000 g/mol. The Mark-Houwink parameters of the polymers from runs 1-7, K and α, for the universal calibration method were chosen as those of the polyBA, in view of the BA concentration in the copolymer (96 wt %). The K and a for polyBA are $1.1 \times 10^{-4}$ dL/g and 0.708 respectively.

$M_c$ was determined in accordance with the method reported previously [11]. In the $M_c$ calculations, the polymer density ($\rho_p$=1.06 g/mL) and solubility parameter ($\delta_1$=8.9 $(cal/mL)^{1/2}$) of polyBA were used. $M_e$ was calculated with a previously reported method using the value of monodisperse polyBA, $M_e$=208 kg/mol, for the calculations [11]. The $T_g$ was measured with a differential scanning calorimeter (Model Q1000 from TA Instruments) with a temperature sweep range of −80 to 80° C. in order to avoid reaction between AA and HEMA at elevated temperatures.

PSA performance including loop tack, peel strength and shear strength were evaluated according to the Pressure Sensitive Tape Council standards PSTC-6, PSTC-1 and PSTC-7, respectively [10]. PSA film thickness was measured as ~33

μm. Further details on the measurement methods are reported elsewhere [11]. Shear strength was measured using two contact areas: 1"×1" and ½"×½", because it was observed that with a contact area of 1"×1", most of the heated PSAs showed shear strengths too large to be measured within a reasonable time period (e.g., >1 month).

A contact angle method was used to measure the surface tension of the PSA films with VCA Optima contact angle equipment from AST Products Inc. DDI water and diiodomethane were used as the testing liquids with known surface tensions.

PSA film surfaces were imaged by atomic force microscopy (AFM) in tapping mode using a Multimode Scanning Probe Microscope (Veeco Instruments) and silicon cantilevers (Vistaprobes from NanoScience Instruments). The tip of the cantilever had a pyramidal geometry and the tip radius was 10 nm. The cantilevers had a resonant frequency of 300 kHz with a spring constant of 40 N/m. Height and phase images were taken in air at ambient temperature. The scan speed was about 0.9 Hz and the scanned area was about 5 μm×5 μm.

Example 1

General Polymerization Procedure

All BA/AA/HEMA (weight ratio: 96/2/2) latexes used for making PSA films were prepared by a starved seeded semi-batch emulsion polymerization process as set forth in Reference 18, incorporated by reference herein in its entirety. The polymerization process included three stages: (i) a short batch stage to produce seed latexes; (ii) a long feeding stage to further grow the latex particles, and a short cook stage to fully react the remaining monomers in the latexes. The latex polymerization formulations are shown in Table 1. By varying the amount of CTA (AMA) and cross-linker (NDM) used during the feed stage of the polymerization process, a variety of latexes with different microstructures were prepared.

TABLE 1

Latex polymerization formulations.

| Formulation Component | Initial charge (g) | Feeding (g) Monomer emulsion | Feeding (g) Initiator solution |
|---|---|---|---|
| $H_2O$ | 202/15* | 89 | 90 |
| KPS | 0.4 | — | 0.90 |
| BA | 11.58 | 324.48 | — |
| AA | — | 6.76 | — |
| HEMA | — | 6.76 | — |
| MMA | 0.42 | — | — |
| NDM | — | 0-0.4 phm** | — |
| AMA | — | 0-0.2 phm** | — |
| SDS | 0.45 | 4.25 | — |
| $NaHCO_3$ | 0.05 | — | — |

*Water used for initiator solution in seed production stage.
**phm = parts per hundred parts monomer, varied as indicated in Table 2.

To begin the polymerization, all the initial charge except for the initiator solution and monomers was added to a one-liter stainless steel Mettler-Toledo LabMax™ reactor at room temperature. The reactor vessel was equipped with an anchor stirring blade as well as feeding and sampling ports. The stirring speed was maintained at 250 rpm throughout the polymerization process. The reactor temperature was then increased to 70° C. within 30 min and then the monomer mixture and initiator solution were added. The temperature was raised to 75° C. within 5 min, and maintained at 75° C. for 10 min for the seed latex production stage. Next, the monomer emulsion and initiator solution (Table 1) were fed to the reactor using two separate metering pumps at constant rates and feeding times of 2.5 and 3 h, respectively. At the completion of the feed stage, the polymerization was continued for an additional 50 min in order to react the remaining monomers (i.e., a cook stage). During the polymerization process, samples were taken at feed times of 0, 20, 50, 100, 150, and 180 min, as well as at the end of the polymerization. These samples were used to monitor particle growth as well as monomer conversion. The latex was then cooled to below 30° C. and HQ was added to quench the polymerization. The pH of the latex was adjusted to ~5.5 with ammonia. The solids content of the latex were adjusted to ~45 wt % by adding DDI-$H_2O$, in order to modify the latex viscosity (and therefore produce quality PSA films). The latexes prepared by this procedure are presented in Table 2. Latexes 1B-5B were prepared in the absence of cross-linker. Latexes 6B and 7B were prepared using both a cross-linker and a chain transfer agent. As shown in Table 2, it was possible to prepare latexes with similar gel content, yet differing $M_c$ and $M_w$.

TABLE 2

BA/AA/HEMA latexes (weight ratio 96/2/2) and their polymer microstructures.

| Latex ID* | NDM (phm) | AMA (phm) | Gel content (wt %) | $M_w$ ($\times 10^{-3}$ g/mol) | $M_n$ ($\times 10^{-3}$ g/mol) | $M_c$ ($\times 10^{-3}$ g/mol) | $M_e$ |
|---|---|---|---|---|---|---|---|
| 1B | 0.20 | 0 | 0 | 252 | 48 | — | 26 |
| 2B | 0.15 | 0 | 13 | 470 | 66 | — | 22 |
| 3B | 0.10 | 0 | 36 | 656 | 78 | — | 22 |
| 4B | 0.05 | 0 | 51 | 443 | 105 | 82 | 21 |
| 5B | 0 | 0 | 75 | 217 | 70 | 59 | 21 |
| 6B | 0.40 | 0.20 | 49 | 113 | 28 | 38 | 27 |
| 7B | 0.20 | 0.20 | 74 | 87 | 42 | 20 | 23 |

*"B" in the Latex ID signifies that the pH of the latex was adjusted to pH ~5.5.

Example 2

General Procedure for Preparation and Testing of PSA Films

Aged PSA films were prepared in two steps. First, the latexes prepared in Table 2 were each coated on a 50 μm thick Mylar sheet with a 30# Meyer rod to make films with thicknesses of ~33 μm. Second, the films were then dried and aged for a period of 24 h at a temperature of 23° C. and at a relative humidity of 50% to provide the aged PSA films (Table 3). Testing was performed on the aged PSA films.

Heat-treated PSA films were prepared from the aged PSA films. To prepare the heat-treated PSA films, the aged PSA films were heated via two steps: (i) heating at 90° C. for 10 min (to remove residual water in the aged PSA films) and (ii) heating at a higher temperature (e.g., 120 or 126° C.) to facilitate reaction between the carboxyl groups (from the AA units) and the hydroxyl groups (from the HEMA units). These temperatures were chosen because it was determined that at lower temperatures (e.g., 100° C.) the reaction was sluggish, while at higher temperatures (e.g., 140° C.) visible shrinkage of the Mylar backing material of the PSA film was observed. Heat-treated PSA films (Table 3) were further conditioned for a period of 24 h at a temperature of 23° C. and at a relative humidity of 50% prior to testing.

Nomenclature convention for aged and heat-treated PSA films. As presented herein, the aged PSA films in Table 3 were named after their latex ID (Table 2) followed by a "B", which identifies that the pH of the latex was adjusted to ~5.5 following the polymerization reaction. For example, "PSA 2B" refers to the PSA film cast from latex ID 2 of pH ~5.5 and aged as described above. Unless specifically stated otherwise, all unheated PSA films described herein were aged prior to testing. Similarly, heat-treated PSA films in Table 3 were named with their respective latex ID, the pH of the latex, as well as the temperature (i.e., the higher of the two temperatures described above) and length of time the aged PSA film was heated. For example, PSA 5B-H126/11 refers to the PSA film cast from latex 5 of pH of ~5.5, aged as described above, and heated at 126° C. for 11 minutes.

Table 3 indicates the aged and heat-treated PSA films prepared by the procedure described herein. Table 4 indicates PSA performance testing results for aged and heat-treated PSAs. Further performance testing results are shown in FIGS. 2, 3, 4, and 8.

TABLE 3

BA/AA/HEMA (weight ratio 96/2/2) PSAs and their polymer microstructures.

| PSA ID* | Gel content (wt %) | x† (wt %) | $M_w$ | $M_n$ | $M_c$ | $M_e$ |
|---|---|---|---|---|---|---|
| | | | | ($\times 10^{-3}$ g/mol) | | |
| 1B | 0 | 32 | 252 | 48 | — | 26 |
| 1B-H120/11 | 8 | | 532 | 84 | | |
| 1B-H120/21 | 15 | | 643 | 88 | | |
| 1B-H120/30 | 38 | — | 425 | 75 | — | — |
| 1B-H126/11 | 10 | | 534 | 101 | | |
| 1B-H126/16 | 25 | | 424 | 100 | — | — |
| 1B-H126/21 | 30 | | 382 | 86 | | |
| 2B | 13 | 15 | 470 | 66 | — | 22 |
| 2B-H126/16 | 40 | — | 394 | 70 | — | |
| 3B | 36 | | 656 | 78 | — | 22 |
| 4B | 51 | 10 (30) | 443 | 105 | 82 | 21 |
| 4B-H126/11 | 70 | — | 216 | 73 | — | |
| 4B-H126/21 | 79 | — | 190 | 72 | — | — |
| 5B | 75 | — (12) | 217 | 70 | 59 | 21 |
| 5B-H126/11 | 81 | — | 161 | 78 | 53 | — |
| 6B | 49 | 48 | 113 | 28 | 38 | 27 |
| 6B-H126/11 | 63 | — | 109 | 43 | — | — |
| 7B | 74 | | 87 | 42 | 20 | 23 |
| 7B-H126/11 | 79 | | 73 | 42 | 22 | — |
| TK1‡ | 45 | (—) | 188 | 36 | 143 | 25 |
| TK1-H121/10‡ | 77 | (—) | 100 | 30 | 76 | 23 |
| TK2§ | 0 | | 271 | 75 | — | 23 |
| TK2-H121/10§ | 80 | | 79 | 30 | 63 | 23 |

*"B" in the PSA ID signifies the pH of latex was adjusted to pH ~5.5.
†The indicated values refer the wt % of small sol polymers with sizes smaller than $2M_e$ in the total sol polymers, as determined by GPC. The parenthetical values refer to the wt % of the sol polymers with sizes larger than $20M_e$ in the total sol polymers, as determined by GPC.
‡TK1 is a latex-based BA/AA/IBMA (isobutoxymethyl acrylamide) PSA prepared in a weight ratio of 96.4/2.5/1. TK1-H121/10 is the PSA obtained by heating PSA TK1 at 121° C. for 10 min. See Table IV of ref. 1.
§TK2 is BA/AA (weight ratio: 97.5/2.5) statistic copolymer produced by solution polymerization (see Table I of ref. 17). TK2-H121/10 is the PSA obtained by heating the PSA TK2 copolymer solution at 121° C. for 10 min (see Table IV of ref. 17).

TABLE 4

BA/AA/HEMA (weight ratio 96/2/2) PSA performance testing results.

| PSA ID | Tack (N/m) | Peel Strength (N/m) | Shear Strength (h, ½" × ½") |
|---|---|---|---|
| 4B | 216 | 185 | 0.52 |
| 4B-H126/11 | 323 | 236 | 11.30 |
| 4B-H126/21 | 299 | 210 | 20.20 |
| 5B | 176 | 104 | 1.10 |
| 5B-H126/11 | 280 | 190 | >336 h* |
| 6B | 223 | 203 | 0.13 |

TABLE 4-continued

BA/AA/HEMA (weight ratio 96/2/2) PSA performance testing results.

| PSA ID | Tack (N/m) | Peel Strength (N/m) | Shear Strength (h, ½" × ½") |
|---|---|---|---|
| 6B-H126/11 | 450 | 270 | 5.10 |
| 7B | 154 | 87 | 0.70 |
| 7B-H126/11 | 209 | 118 | 292.80 |
| TK1[a] | 193 | 246 | 0.83 |
| TK1-H121/10[b] | 211 | 123 | 18.33 |

Note:
see FIGS. 2, 3, 4, and 8 for additional tack, peel, and shear strength data.
*No sign of shear failure was observed after 2 weeks.

Example 3

Comparison of Gel-Free PSA 1B to its Heated Counterpart(s)

Aged, gel-free, PSA 1B was heated to evaluate changes in the polymer microstructure and performance as a result of the heating. In separate experiments, the gel-free PSA 1B was heated at two temperatures (i.e., 120 and 126° C.) for varying periods of time (i.e., 11-30 min). The polymer microstructure data for the aged PSA 1B and its heated counterparts is presented in Table 3 and FIG. 2A. Performance data with regard to tack, peel, and shear strengths are presented in FIGS. 2B-2D. Generally, gel content was found to increase with increasing heating time at a given temperature (FIG. 2A). With the increasing in gel content, $M_w$ of the sol polymers first increased to a maximum at a low gel content (i.e., 15 wt % at 120° C.) and then decreased. A similar trend was observed with the aged, but unheated, PSA films 1B-5B.

Without wishing to be bound by any particular theory, it is believed that, through the reaction between the carboxyl and hydroxyl groups from the AA and HEMA units of the aged PSAs, two or more polymer chains could be chemically-bonded and form a larger polymer chain. Should the resulting polymer be sufficiently large, it would become a gel polymer. If not sufficiently large, it would be a sol polymer. If the heating time is not sufficiently long, most of the sol polymers grow into larger sol polymers while a smaller fraction of sol polymers grow into gel polymers. Hence, $M_w$ would initially increase with the increase in gel content. With increasing the heating time, a significant amount of gel polymers were formed in the heated PSAs, resulting in an increase in gel content. It is possible that the gel polymers in the heated PSAs were mainly from the larger sol polymers in the aged and unheated PSAs, since they possess more functional groups for reaction and consequently further growth. Thus, with the transformation of a significant amount of larger sol polymers into gel polymers, the average size of the sol polymers ($M_w$) becomes smaller.

FIGS. 2B-2D show that with the increase in gel content, the shear strength increased, while tack and peel strength displayed maxima. A similar trend was observed with the unheated latex-based PSA films 1B-5B. Without wishing to be bound by any particular theory, it is believed that with increasing gel content, the cohesive strength of the PSA films was enhanced, resulting in larger shear strength. The larger cohesive strength decreased the PSAs' deformability and flow ability, and led to less wetting of the PSA films on the substrate during the bonding process. In addition, the larger gel content lowered the PSAs' capability for elongation [12], and consequently PSAs with a larger gel content experienced a smaller strain [13-14], compared to the PSAs with a lower gel content. Accordingly, the PSAs with larger gel content dissipated a smaller amount of energy during the debonding process. Less wetting, as well as less dissipated energy, led to a general decrease in tack and peel strength with increasing gel content. The special case of tack and peel strength increases with gel content observed at low gel contents (e.g., from 0 to 15 wt %) may be interpreted as follows: (1) due to the small gel content, the detrimental effect of gel on decreasing the PSAs' elongation capability was negligible; (2) when the gel content was low, the $M_w$ increased with gel content. The increase in $M_w$ endowed the higher gel content PSAs with larger elongation capability compared to the lower gel content PSAs. Consequently, the larger gel content PSAs may have experienced larger strain and dissipated a larger amount of energy during the debonding process. For these low gel content PSAs, the beneficial effect of a larger amount of dissipated energy on tack and peel strength may have counterbalanced the detrimental effect of less wetting. Hence, tack and peel strength increased with gel content.

Example 4

Comparison of Heated PSAs Derived from PSA 1B to PSAs 3B and 4B

Heat-treated PSA films 1B-H126/16 and 1B-H120/30 were compared to aged PSA films 3B and 4B with respect to their polymer microstructure and performance to assess whether the heat-treated PSA films exhibited improved performance in comparison to the aged PSAs with similar polymer microstructures. The polymer property and performance data of the PSAs are shown in Table 3 and FIG. 3, respectively. From this data, it is evident that at a lower gel content, the heat-treated PSAs, showed larger shear strength as well as larger tack and peel strength in comparison to the aged PSAs 3B and 4B with higher gel contents. Without wishing to be bound by any particular theory, it is believed that the better performance of the heat-treated PSA was attributed to its unique microstructure. Since PSA 1B was gel-free and possess $M_w>2M_e$, the gel network in the corresponding heat-treated PSAs should be continuous, while the gels in PSAs 3B and 4B were discrete. Hence, PSA 1B-H126/16 showed larger shear strength than the PSAs 3B and 4B, despite its lower gel content. The higher tack and peel strength of PSA 1B-H126/16 can be interpreted as follows: At lower gel content, PSA 1B-H126/16 likely possesses larger deformability and flow ability, in comparison to PSAs 3B and 4B. Hence, it may wet the substrate better during tack and peel strength testing. Due to its lower gel content, it likely possesses a larger elongation capability and accordingly it should have dissipated more energy by forming a larger strain during the debonding process of tack and peel strength testing. Both better wetting and a larger amount of dissipated energy contributed to the larger tack and peel strength of PSA 1B-H126/16.

Figure 3:
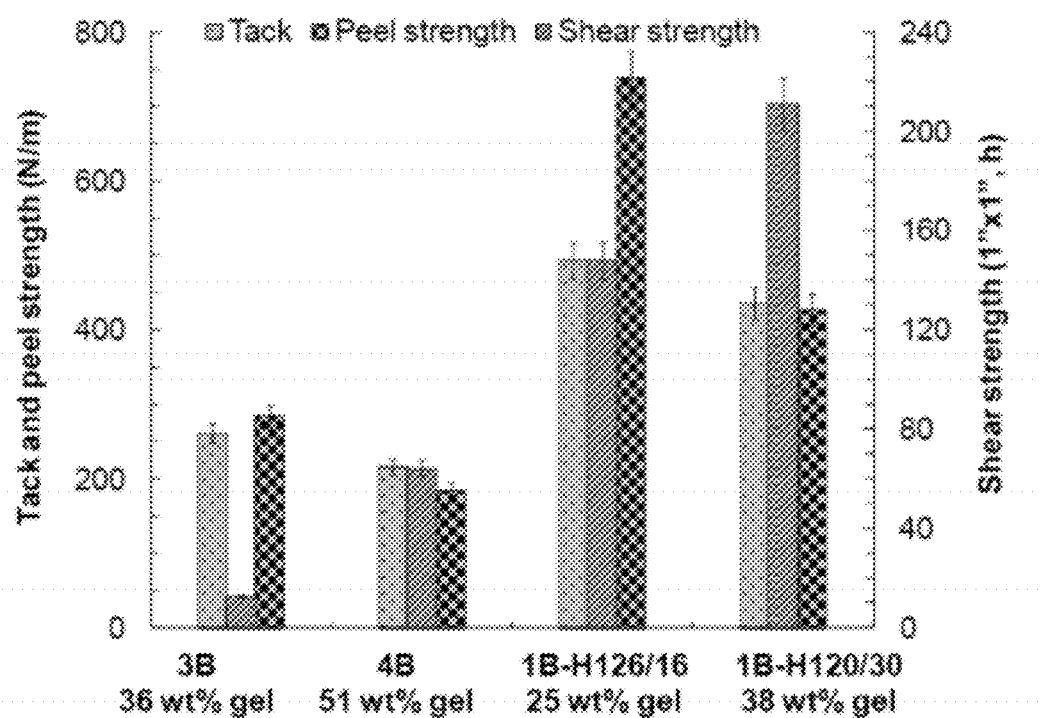
FIG. 3 is a graph depicting tack, peel strength, and shear strength performance of 3B, 4B, 1B-H126/16 and 1B-H120/30.

From Table 3 and FIG. 3, it is also evident that at similar gel contents (i.e., ~36 wt %), the heat-treated PSA 1B-H120/30 showed larger shear strength as well as larger tack and peel strength, in comparison to the unheated PSA 3B. The larger shear strength was due to its continuous gel structure. The larger tack and peel strength may be caused by two factors. First, the heated PSA film (i.e., 1B-H120/30) may have had a loose gel network (i.e., a larger $M_c$), in comparison to the unheated PSA film with similar gel content (i.e., 3B). Thus, it possessed larger deformability and could wet the substrate better. Second, the heated PSA film may have had a smoother surface, due to the possible flow of PSA polymers during the heating process.

Example 5

Figure 4:
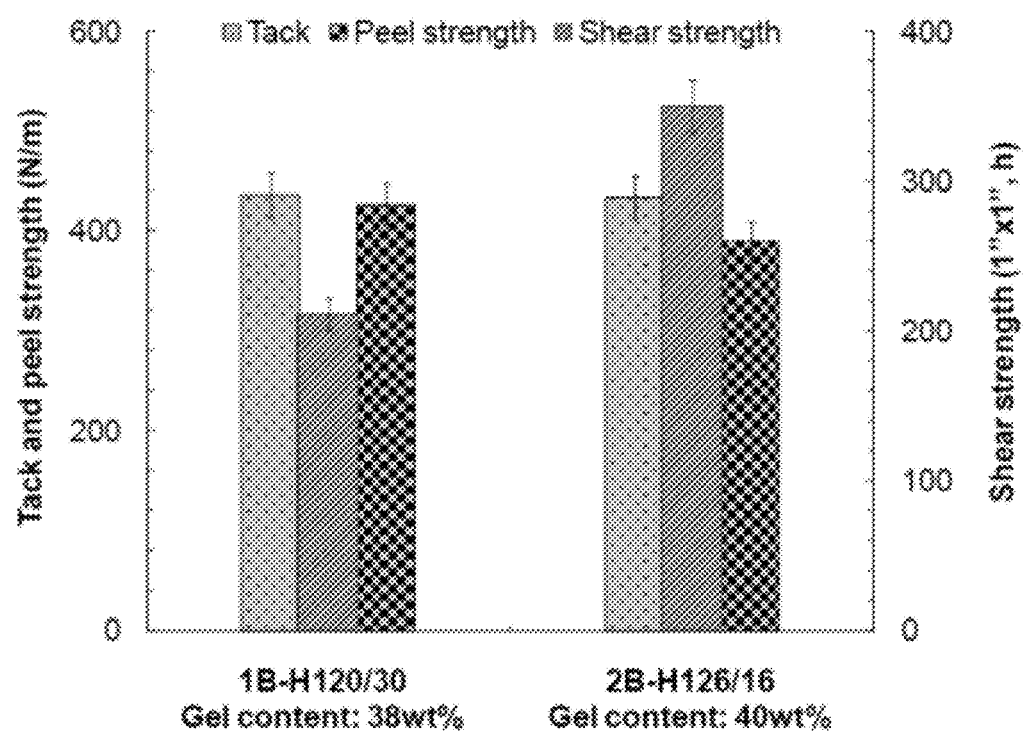
FIG. 4 is a graph depicting tack, peel strength, and shear strength performance of 1B-H120/30 and 2B-H126/16.

Effect of Small Sol Polymers in the Gel-Free or Low Gel Content PSAs on the Performance of their Heat-Treated Counterparts PSAs 1B and 2B were heated to study the influence of the presence of small sol polymers (i.e., sol polymer smaller than <$2M_e$) on the performance of heat-treated PSAs. The polymer properties of these two PSAs and their heat-treated counterparts are presented in Table 3. The performance of the treated PSAs 1B-H120/30 and 2B-H126/16 is shown in FIG. 4. From Table 3 and FIG. 4, it is apparent at a similar gel content (i.e., ~40 wt %), the post-treated PSA 1B-H120/30 had a smaller shear strength but similar tack and slightly higher peel strength, in comparison to post-treated PSA 2B-H126/16. Considering the similar tack and peel strength values, it is believed that $M_c$ values should be similar as well. If $M_c$ values differed, these two PSAs would have exhibited a significant difference in deformability and wetting capability on the testing panel, resulting in a significant difference in tack and peel strength values. Since PSAs 1B-H120/30 and 2B-H126/16 had similar gel contents, and likely similar $M_c$ values, the smaller shear strength of the former PSA likely resulted because it possessed a less perfect continuous gel network.

Figure 5:
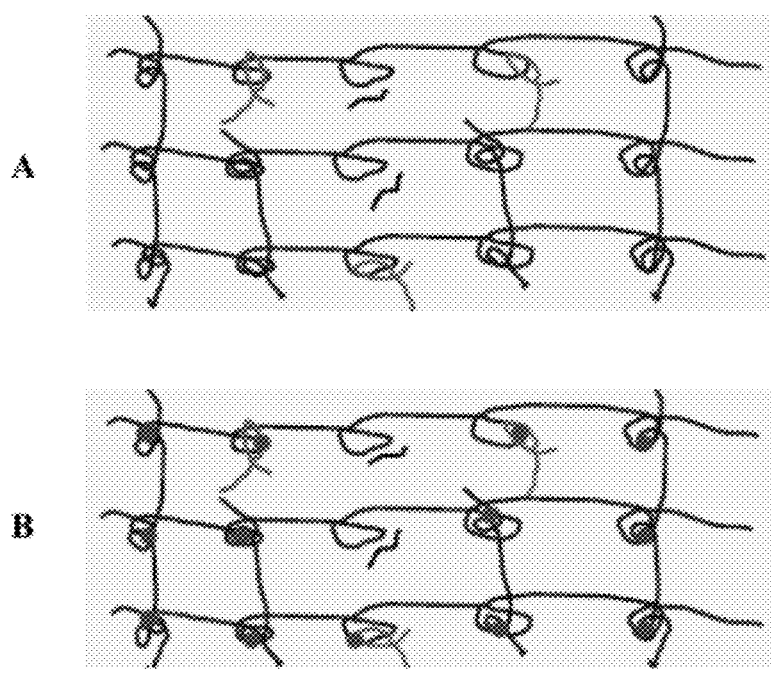
FIG. 5A is an illustration of the polymer microstructure of a gel-free latex-based PSA film with sol polymers of $M_w$ less than $2M_e$.
FIG. 5B is an illustration of the polymer microstructure of the PSA film obtained from heating the PSA film in FIG. 5A.

From Table 3, it is evident that both PSAs 1B and 2B had low gel contents as well as $M_w$ of the sol polymers greater than $2M_e$. Hence, their respective heated PSAs, 1B-H120/30 and 2B-H126/16, likely both possess continuous gel networks.[1] Table 3 also reveals that PSA 1B had a larger amount of small sol polymers (size<$2M_e$) in comparison to PSA 2B (i.e., 32 wt % vs. 15 wt %). These small sol polymers may have a detrimental effect on the gel network of the treated PSAs. As shown in FIG. 5A, small sol polymers with size greater than or equal to $M_e$ but less than $2M_e$ may only entangle with other polymer chains at one end; while the small sol polymers with size less than $M_e$ cannot entangle with other polymer chains. After treatment, the small sol polymers with size greater than or equal to $M_e$, but less than $2M_e$, could become branches (FIG. 5B). Although these branches were part of the gel network, they could not enhance the network's capability to resist deformation. Additionally, the presence of a significant amount of small sol polymers of size less than $2M_c$ in the aged PSA films may cause a large variance of the chain segments between two adjacent cross-linking points of the gel network in their corresponding post-treated PSAs (FIGS. 5A-5B). The formation of such an imperfect gel network would lower the post-treated PSA films' capability to resist deformation, and accordingly, would lead to smaller shear strength for the heated PSA films. Thus, increasing the amount of small sol polymers in low gel content latex-based PSAs has a detrimental effect on the performance of their corresponding heat-treated PSAs.

Example 6

Effect of Simultaneously Increasing $M_c$ and $M_w$ of PSAs on the Performance of Their Heat-Treated PSAs Aged PSAs 5B and 7B were heated under the same conditions (126° C./11 min) to determine if simultaneously increasing the $M_c$ and $M_w$ for similar gel content latex-based PSAs would result in improved performance for the corresponding heated PSAs. The polymer properties and performance of PSAs 5B and 7B as well as their heated counterparts, 5BH126/11 and 7B-H126/11, are shown in Tables 3 and 4. Aged PSAs 5B and 7B had similar gel contents (~75 wt %), but the $M_c$ and $M_w$ of PSA 5B were larger than those of PSA 7B. In addition, PSA 5B had $M_c>M_e$ and $M_w>2M_e$, such that the microgels in PSA 5B could be entangled by the sol polymers. As for PSA 7B, the $M_w$ of the sol polymers was also larger than $2M_e$ but $M_c$ was similar to $M_e$. However, since $M_c$ is only an average number of the size of the chain segments between two adjacent cross-linking points, the microgels in PSA 7B could be entangled by the sol polymers. In any case, compared with 7B, the microgels in PSA 5B are likely better entangled by the sol polymers, due to a larger $M_c$ and $M_w$. This was confirmed by the larger shear strength of PSA 5B compared to PSA 7B.

Figure 6:
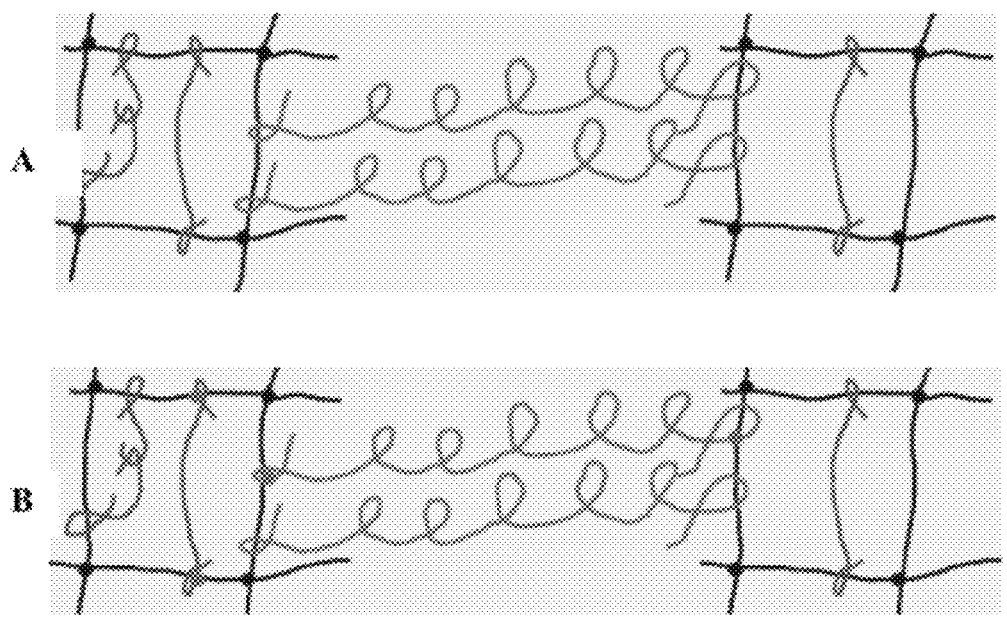
FIGS. 6A and 6B are illustrations showing the effect of heating 5B on the molecular weight between adjacent cross-link points, $M_c$.

Table 3 further shows that 5B-H126/11 had a larger gel content, smaller $M_w$ and slightly smaller $M_c$ compared to unheated PSA 5B. Similar polymer microstructure differences were observed by comparing PSA 7B-H126/11 to unheated PSA 7B. The decrease in $M_w$ with increase in gel content resulted as larger sol polymers in the unheated PSAs were more likely to undergo further growth and thereafter became part of the gel network during the heating process due to their larger size and consequently, the larger amount of functional groups present. The small decrease in $M_c$ observed after heat-treating PSA 5B (i.e., $M_c$ of 59 and 53 kg/mol for 5B and 5B-H126/11, respectively) was unexpected. However, since the gel content only increased by a small amount (6 wt %) after heating PSA 5B, hence the change in $M_c$ may also be small. Also, the $M_c$ of PSA 5B was about ~3$M_e$, thus, some sol polymers were trapped inside the microgels in PSA 5B, and some of the sol polymers were also entangled with the microgels (FIG. 6A). The transformation of this kind of entanglement points into cross-linking points during the heating process would tend to decrease the $M_c$ as shown in FIGS. 6A-6B. In contrast, in the case of PSA 5B, some sol polymer chains entangled with two adjacent microgels. If these types of entanglement points transformed into cross-linking points during the heating process, the $M_c$ may increase. A possible reason for this phenomenon is that the newly formed chain segment between the two adjacent cross-linking points was as large as the reacted sol polymers, which had values of $M_w$ larger than the $M_c$ of the original PSA 5B. The two mentioned contradictory effects on $M_c$ might have counterbalanced each other, resulting in a small change in $M_c$ after post-treating PSA 5B.

Table 4 shows that after heating of PSAs 5B and 7B resulted increased shear strength, despite a small gel content change. For example, PSA 5B (gel content: 75 wt %) had a shear strength of 1.1 h and PSA 5B-H126/11 (gel content: 81 wt %) exhibited a shear strength larger than two weeks at the same contact area. This indicates that the discrete gel network had been changed into a continuous gel network as a result of heating PSAs 5B and 7B. In addition, from Table 4 it is observed that at a similar gel content of about 80 wt %, PSA 5B-H126/11 had larger shear strength, compared to PSA 7B-H126/11, despite its looser gel network (i.e., larger $M_c$). Thus, a more perfect gel network was formed in PSA 5B-H126/11, compared to PSA 7B-H126/11. A possible rationale for this effect is that by simultaneously increasing the $M_c$ and $M_w$ for similar gel content latex-based PSAs, more sol polymers entangle with the microgels and consequently the connection between the microgels were improved. Accordingly, a more perfect continuous gel network would form in its corresponding heated PSA, resulting in higher shear strength.

From Table 4, it is apparent that heating PSAs 5B and 7B also resulted in increased tack and peel strength. The increase in tack and peel strength with gel content was unexpected, as it was found in a previous study that for BA/AA/HEMA PSAs (weight ratio: 96/2/2) tack and peel strength decreased with increasing gel content when the gel content was larger than about 15 wt %. It is possible that the PSA surface tension might have changed after heating, since it is known that a PSA films' peel strength can be increased by increasing the surface tension of the PSA and consequently the chemical interaction energy between the surfaces of these PSA films and substrate [15-16]. Accordingly, surface tensions were measured for PSAs 5B and 5B-H126/11 (Table 5).

TABLE 5

Contact angle measurement data for PSA 5B and 5B-H126/11.

| PSA ID | Contact angle (°) | | $\gamma^d$ | $\gamma^p$ | $\gamma$ | I |
|---|---|---|---|---|---|---|
| | $\theta_1$ ($H_2O$) | $\theta_2$ ($CH_2I_2$) | (dyne/cm) | | | |
| 5B | 59 | 72 | 15 | 30 | 45 | 84 |
| 5B-H126/11 | 97 | 71 | 20 | 6 | 26 | 67 |

$\gamma_p$, $\gamma_p^d$ and $\gamma_p^p$ refer to the PSAs' surface tension, and the dispersion and polar components of the surface tension. I is the chemical interaction energy between the surfaces of the PSA film and the stainless steel testing panel.

From Table 5, it is evident that heat-treated PSA 5B-H126/11 had smaller surface tension ($\gamma^p$) compared to unheated PSA 5B, and consequently a smaller chemical interaction energy (I) between the PSA film and the stainless steel testing panel. The smaller surface tension of the heated PSA is consistent with the reaction between AA and HEMA during post-treatment. The reaction of the polar carboxyl and hydroxyl groups from AA and HEMA units resulted in the formation of non-polar ester groups and tended to decrease the PSA's surface tension.

From these results it is evident that heat-treatment can greatly improve the performance of latex-based PSAs. Shear strength can be increased along with both tack and peel strength. Additionally, simultaneously increasing the $M_c$ and $M_w$ for similar gel content latex-based PSAs, imparts better performance of the heated PSAs with respect to increased shear, tack, and peel strength.

Example 7

Effect of Small Sol Polymers in Gel-Containing PSAs on the Performance of their Heated Counterparts PSAs 4B and 6B were each heated under the same conditions (126° C./10 min) to determine if increasing the amount of small sol polymer in gel-containing latex-based PSAs (i.e., size<$2M_e$) would impact the performance properties of the corresponding heat-treated PSAs. The polymer properties and performance of PSA 4B and 6B as well as their heated counterparts, PSAs 4B-H126/11 and 6B-H126/11, are shown in Tables 3 and 4.

From Table 3, it is evident that PSAs 4B and 6B both had $M_w$ larger than $2M_e$ and $M_c$ larger than $M_e$. Thus, for both PSAs, the microgels could be entangled by the sol polymers. PSAs 4B and 6B had similar gel contents, although PSA 4B had a larger $M_c$ and $M_w$ in comparison to PSA 6B. PSAs 5B and 7B compared similarly. As indicated in Table 3, in comparison to PSA 6B, PSA 4B had a smaller fraction of sol polymers with sizes less than $2M_e$ (10 wt % vs. 48 wt %). The larger shear strength observed for PSA 4B in comparison to PSA 6B (0.52 h vs. 0.13 h, Table 4), is consistent with improved entanglement between the sol polymers and the microgels of PSA 4B as a result of larger values for $M_c$ and $M_w$, as well as a decreased amount of small sol polymers.

Table 3 also shows that heating of PSAs 4B and 6B resulted in increased gel content and decreased $M_w$ for the sol polymers. Furthermore, PSAs 4B and 6B showed larger increases in gel content (i.e., increases of 19 wt % and 14 wt %), in comparison to the increases observed upon heating PSAs 5B and 7B (i.e., 6 wt % and 5 wt %) under conditions (126° C./11 min). The larger increases in gel content observed in heated PSAs 4B and 6B is due to the fact that unheated PSAs 4B and 6B had more sol polymers available for further growth into gel polymers. Additionally, from Table 4, it is observed that heating PSA films 4B and 6B not only resulted in increased shear strength, but tack and peel strength as well. Furthermore, the heated PSAs 4B-H126/11 and 6B-H126/11 showed larger shear strengths, in comparison to unheated PSA 5B which possessed an even higher gel content. This result confirms that the discrete microgels in PSAs 4B and 6B are transformed into continuous gel networks with heating.

The larger increase in gel content observed with PSA 4B-H126/11 in comparison to PSA 6B-H126/11 can be explained by the higher weight percentage of small sol polymers (i.e., sol polymers less than $2M_e$) in PSA 6B in comparison to PSA 4B. In particular, for PSA 6B, some of the small sol polymers could not entangle with other polymer chains even at one end. Hence, during the heating process, they could not react with other polymers and become gel. Table 3 also shows that the heated PSA from 4B, 4B-H126/11, possessed a larger shear strength than the heated PSA from 6B, 6B-H126/11. As the gel content difference between PSA 4B-H126/11 and PSA 6B-H126/11 is small (7 wt %), the larger shear strength observed for PSA 4B-H126/11 is attributable to a more perfect continuous gel network in comparison to PSA 6B-H126/11. The less perfect continuous gel network in PSA 6B-H126/11 may be explained as follows: The presence of a larger amount of sol polymers smaller than $2M_e$ in PSA 6B may have caused less entanglement between the sol polymers and the microgels, in comparison to PSA 4B. Accordingly, the gel network of the heated PSA from 6B (i.e., 6B-H126/11) had more weak points around the edges of the original microgels in comparison to PSA 4B.

From these results, it is apparent that increased amounts of small sol polymers in the unheated, gel-containing, PSAs has a detrimental impact on the performance of the heated PSAs. Decreasing the amount of small sol polymers (i.e., size$<2M_e$) in the original gel-containing latex-based PSAs could lead to better performance for the treated PSAs. For example, shear strength could be greatly increased only at a small sacrifice of peel strength.

Example 8

Effect of Large Sol Polymers in Gel-Containing PSAs on the Performance of Their Heated PSAs Tobing found that heating a gel-containing latex with an $M_w$ of about $30M_e$ did not significantly improve the performance properties of the adhesive [1], indicating that if the $M_w$ of a gel-containing latex is larger than $20M_e$, then the microgel could not be turned into a continuous gel network upon heating. Since $M_w$ is only an average number, the effect of an increased amount of sol polymers with $M_w$ greater $20M_c$ on heated PSAs of the present PSA system was studied, under the condition of $M_c > M_e$ and $2M_e < M_w \le 20M_e$. For this purpose, PSAs 4B and 5B as well as their heated counterparts were studied. Their polymer microstructure and performance are shown in Tables 3 and 4.

Unheated PSAs 4B and 5B both had $M_c > M_e$ as well as $2M_e < M_w \le 20M_e$. As previously indicated, both PSAs could form a continuous gel network upon heating. PSA 4B had a lower gel content, a larger $M_w$, and a higher weight percentage of large sol polymers in comparison to PSA 5B. From Table 3 and Table 4, it is apparent that the similar gel contents of PSAs 4B-H126/21 and 5B-H126/11 (i.e., ~80 wt %) resulted in similar tack and peel strength measurement for these heated PSAs. The smaller shear strength observed for PSA 4B-H126/21 in comparison to PSA 5B-H126/11 was attributed to a less perfect gel network for PSA 4B-H126/21.

Figure 7:
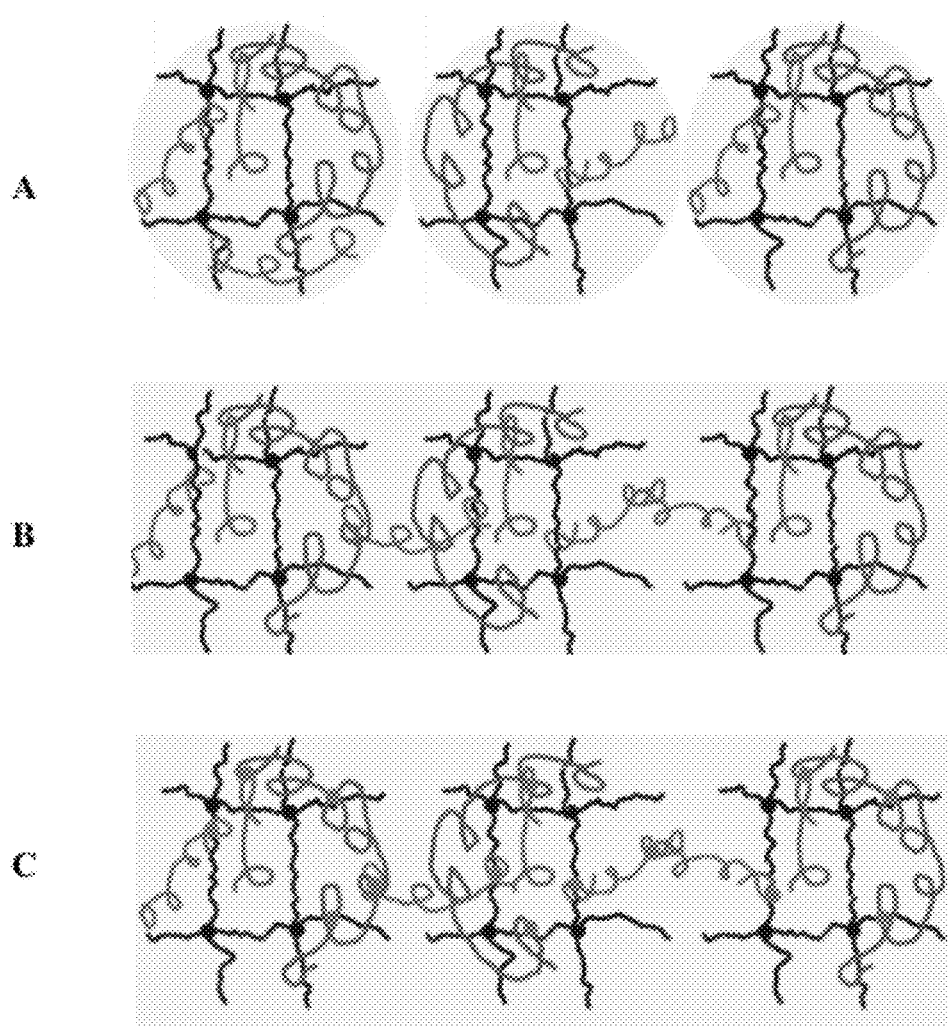
FIGS. 7A, 7B, and 7C are illustrations depicting changes in polymer microstructure of latex 4B from the latex state (FIG. 7A), to a latex PSA film 4B (FIG. 7B), and finally to heated PSA film 4B-H126/21 (FIG. 7C).

The detrimental effect of large sol polymers on the performance of gel-containing PSAs can be rationalized on the basis of the film formation processes shown in FIG. 7. In particular, during the film formation process, some sol polymer chains of one latex particle may diffuse across particle boundaries. If the $M_w$ of the sol polymer is larger than $2M_e$, the sol polymer is able to densely entangle two adjacent microgels. Very large sol polymers (i.e., with $M_w > 20M_e$) cannot move quickly, hence they tend to remain in their local latex particles and entangle with either the local sol or local microgel polymers. Furthermore, the large sol polymers entangle with neighboring small or medium size sol polymers in the local latex particle, slowing the diffusion of the small and medium size sol polymers during the film formation process and during aging of the film. Accordingly, high percentages of large sol polymers in a gel-containing latex reduces the number of entanglement points between adjacent microgels in the corresponding PSA films. As a consequence, less number of cross-linking points for connecting the microgels were formed when heating the PSA film, resulting in a heated PSA film with a less continuous gel network, and accordingly lower shear strength.

Example 9

Comparison of Heated PSA 5B-126/11 to Another Latex-Based PSA with Similar Microstructure The performance data with respect to tack, shear, and peel strength for PSA 5B-H126/11 was compared to data previously reported by Tobing for a heat-treated PSA with similar gel content, and similar monomer composition [1]. As shown in Table 3, the PSA for comparison, TK1-H121/10 (prepared from TK1), was also heated-treated, like PSA 5B-H126/11. Several observations are noteworthy. First, while heating of PSA 5B provided an adhesive which displayed a substantial increase in shear strength, as well as tack and peel strengths, heating of TK1 provided an adhesive with increased shear strength at the expense of peel strength (Table 4). Tack was only modestly increased by heating TK1. Second, despite the similar gel contents and monomer composition of TK1-H121/10 and 5B-H126/11, the performance properties with respect to tack, peel strength, and shear strength are significantly better for 5B-H126/11. Third, in contrast to TK1-H121/10, 5B-H126/11 was prepared from an aged latex film. In particular, TK1 was heated directly, without aging. Thus, the data suggests that aging of a latex film prior to heating provides an adhesive with substantially improved performance properties.

Example 10

Figure 8:
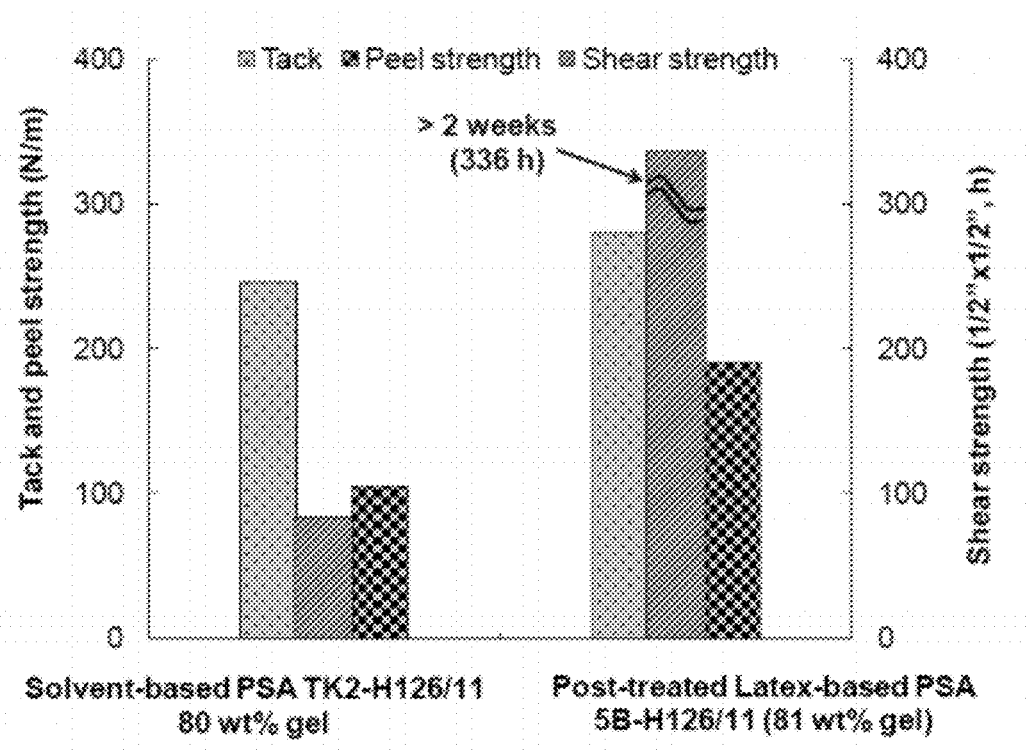
FIG. 8 is a graph showing the enhanced PSA performance of the heated latex-derived PSA film 5B-H126/11 with respect to tack, peel strength, and shear strength in comparison to solvent-based PSA TK2-H126/11.

Comparison of the Performance of Heated PSAs to Solvent-Based PSAs with Similar Microstructure The performance of the heat-treated latex-based PSAs prepared herein were compared to a solvent-based PSA with a similar polymer microstructure. In particular, PSA 5B-H126/11 obtained from this study was compared with solvent-based PSA TK2-H121/10 as reported by Tobing [17]. PSA 5B-H126/11 and TK2-H121/10 have a similar copolymer composition: BA/AA/HEMA weight ratio of 96/2/2 for the former and BA/AA weight ratio of 97.5/2.5 for the latter. As shown in Table 3, latex-based and solvent-based PSAs have similar gel content, $M_c$ and $M_w$. FIG. 8 shows that latex-based PSA 5B-H126/11 yielded a better performance than the solvent-based PSA TK-H121/10 with respect to shear strength, tack, and peel strength.

REFERENCES

1. Tobing S. D., A. Klein, Journal of Applied Polymer Science 2001, 79: 2558-2564.
2. Papsin J., George A., U.S. Pat. No. 6,281,298.
3. Kavanagh M. A., Anderson K. S., Erdogan B., U.S. Pat. No. 7,652,103.
4. Krepski L. R., Filiatrault T. D., Mccracken S. D., U.S. Pat. No. 7,714,076.
5. Filiatrault T. D., Kavanagh M. A., Anderson K. S., U.S. Pat. No. 7,652,095.
6. Farwaha R., Boutillier D. N., Phan L., U.S. Pat. No. 6,541,566.
7. Bernard M., U.S. Pat. No. 5,278,227.
8. Keskey W., Schuetz J., Lee D. I., U.S. Pat. No. 4,474,923.
9. Tobing S. D., Klein A., Sperling L. H., Journal of Applied Polymer Science 2001, 81: 2109-2117.
10. Pressure Sensitive Tape Council, Test methods for pressure sensitive adhesive tapes 2004, 14th Edition, Northbrook, Ill.
11. Qie L., Dubé M. A., European Polymer Journal 2010, 46(6): 1225-1236.
12. Zosel A., Ley G., Macromolecules 1993, 26: 2222-2227.
13. Deplace F., Carelli C., Mariot S., Journal of Adhesion 2009, 85: 18-54.
14. Lakrout H., Sergot P., Creton C., Journal of Adhesion, 1999, 69: 307-359.
15. Qie L., Dubé M. A., International Journal of Adhesion & Adhesives 2010, 30(7): 654-664.
16. Li L., Tirrell M., Korba G. A., Journal of Adhesion 2001, 76: 307-334.
17. Tobing S. D., Klein A., Journal of Applied Polymer Science 2001, 79: 2230-2244.
18. Qie L., Dubé M. A., Macromolecular Reaction Engineering 2011, 5, 117-128.

EQUIVALENTS

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms 'comprising,' including, 'containing,' etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase 'consisting essentially of' will be understood to include those elements specifically recited and those additional elements that do not materially affect the basic and novel characteristics of the claimed technology. The phrase 'consisting of' excludes any element not specified.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent compositions, apparatuses, and methods within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as 'up to,' 'at least,' 'greater than,' 'less than,' and the like, include the number recited and refer to ranges which can be subsequently broken down into subranges as discussed above. Similarly, the phrase "at least about" some value such as, e.g., wt % includes at least the value and about the value. For example "at least about 1 wt %" means "at least 1 wt % or about 1 wt %." Finally, as will be understood by one skilled in the art, a range includes each individual member.

Other embodiments are set forth in the following claims.

What is claimed is:

1. A method of making an adhesive comprising:
aging a latex film comprising a mixture of microgels and sol polymers of an acrylic copolymer, wherein the acrylic copolymer comprises copolymerized monomers of a low $T_g$ acrylic monomer, a high $T_g$ monomer, and a hydroxyl-containing acrylic monomer; and wherein the aging step is performed at a temperature of about 20° C. to about 100° C. for a time period from about 1 hour to about 72 hours; and heating the aged latex film such that the sol polymers covalently bond at least some of the microgels to each other through the sol polymers.

2. The method of claim 1 wherein the low $T_g$ acrylic monomer is selected from the group consisting of butyl acrylate, 2-ethylhexyl acrylate, octyl acrylate, and mixtures of any two or more thereof.

3. The method of claim 1 wherein the acrylic copolymer comprises about 90 wt % to about 98 wt % of copolymerized low $T_g$ acrylic monomer.

4. The method of claim 1 wherein the high $T_g$ monomer is selected from the group consisting of acrylic acid, methyl methacrylate, methyl acrylate, styrene, vinyl acetate, and mixtures of any two or more thereof.

5. The method of claim 1 wherein the acrylic copolymer comprises about 1 wt % to about 9 wt % of copolymerized high $T_g$ monomer.

6. The method of claim 1 wherein the hydroxyl-containing monomer is selected from the group consisting of 2-hydroxyethyl methacrylate, 2-hydroxyethyl acrylate, 2-hydroxylpropyl acrylate, and mixtures of any two or more thereof.

7. The method of claim 1 wherein the acrylic copolymer comprises about 1 wt % to about 9 wt % of copolymerized hydroxyl-containing acrylic monomer.

8. The method of claim 1 wherein the low $T_g$ acrylic monomer is butyl acrylate, the high $T_g$ monomer is acrylic acid, and the hydroxyl-containing acrylic monomer is 2-hydroxyethyl methacrylate.

9. The method of claim 1 wherein the acrylic copolymer has a gel content of 0 wt % to about 85 wt %.

10. The method of claim 1 wherein the acrylic copolymer has a $M_e$ of about 20,000 g/mol to about 30,000 g/mol.

11. The method of claim 1 wherein the acrylic copolymer has a $M_e$ of about 10,000 g/mol to about 100,000 g/mol.

12. The method of claim 1 wherein
the acrylic copolymer has a gel content of greater than 0 wt %;
the $M_c$ of the acrylic copolymer is greater than or equal to the $M_e$ of the acrylic copolymer;
the $M_w$ of the sol polymers is larger than twice the $M_e$ of the acrylic copolymer but less than or equal to twenty times the $M_e$ of the acrylic copolymer; and
the weight percentage of the of sol polymers having a $M_w$ less than twice the $M_e$ of the acrylic copolymer is about 10 wt % to about 50 wt.

13. The method of claim 1 wherein
the acrylic copolymer has a gel content of greater than 0 wt %;
the $M_c$ of the acrylic copolymer is greater than or equal to the $M_e$ of the acrylic copolymer;
the $M_w$ of the sol polymers is larger than twice the $M_e$ of the acrylic copolymer but less than or equal to twenty times the $M_e$ of the acrylic copolymer; and
the weight percentage of the of sol polymers having a $M_w$ greater than twenty times the $M_e$ of the acrylic copolymer is about 10 wt % to about 50 wt %.

14. The method of claim 1 wherein the acrylic copolymer is cross-linked with a cross-linker, wherein the cross-linker is an acrylic monomer containing at least two carbon-carbon double bonds.

15. The method of claim 14 wherein the cross-linker is selected from the group consisting of allyl methacrylate, allyl acrylate, ethylene glycol diacrylate, butanediol acrylate, 1,6-hexanediol diacrylate, and mixtures of any two or more thereof.

16. The method of claim 1 wherein the aging step is performed at a relative humidity from about 20% to about 80%.

17. The method of claim 1 further comprising removing water from the acrylic copolymer after the aging step and prior to the heating step.

18. The method of claim 1 wherein the heating step is performed at a temperature from about 80° C. to about 150° C.

19. The method of claim 1 wherein the adhesive has a gel content of about 5 wt % to about 90 wt %.

20. The method of claim 1 wherein the adhesive has a $M_c$ of about 20,000 g/mol to about 75,000 g/mol.

21. The method of claim 1 wherein the adhesive comprises sol polymers with a $M_w$ of about 50,000 g/mol to about 750,000 g/mol.

22. The method of claim 1 wherein the heating step increases an adhesive property of the adhesive in comparison to an aged and unheated latex film of the acrylic copolymer and wherein the adhesive property is selected from the group consisting of tack, peel strength, and shear strength.

23. A method of making an adhesive comprising:
aging a latex film comprising a mixture of microgels and sol polymers of an acrylic copolymer, wherein the acrylic copolymer comprises copolymerized monomers of a low $T_g$ acrylic monomer, a high $T_g$ monomer, and a hydroxyl-containing acrylic monomer; and wherein the aging step is performed at a temperature of about 20° C. to about 100° C. for a time period from about 1 hour to about 1 week; and
heating the aged latex film such that the sol polymers covalently bond at least some of the microgels to each other through the sol polymers.

24. The method of claim 23 wherein the low $T_g$ acrylic monomer is selected from the group consisting of butyl acrylate, 2-ethylhexyl acrylate, octyl acrylate, and mixtures of any two or more thereof.

25. The method of claim 23 wherein the high $T_g$ monomer is selected from the group consisting of acrylic acid, methyl methacrylate, methyl acrylate, styrene, vinyl acetate, and mixtures of any two or more thereof.

26. The method of claim 23 wherein the hydroxyl-containing monomer is selected from the group consisting of 2-hydroxyethyl methacrylate, 2-hydroxyethyl acrylate, 2-hydroxylpropyl acrylate, and mixtures of any two or more thereof.

27. The method of claim 23 wherein the heating step is performed at a temperature from about 80° C. to about 150° C.

* * * * *

UNITED STATES PATENT AND TRADEMARK OFFICE
CERTIFICATE OF CORRECTION

PATENT NO. : 9,051,496 B2  
APPLICATION NO. : 13/262886  
DATED : June 9, 2015  
INVENTOR(S) : Dube et al.

Page 1 of 1

It is certified that error appears in the above-identified patent and that said Letters Patent is hereby corrected as shown below:

Specification

In Column 4, Line 15, delete ""$M_c$"" and insert -- "$M_e$" --, therefor.

In Column 6, Lines 37-38, delete "optimization" and insert -- optimization. --, therefor.

In Column 8, Line 56, delete "$M_c$ of acrylic copolymer (i.e., $2M_c<M_w\leq20M_c$)," and insert -- $M_e$ of acrylic copolymer (i.e., $2M_e<M_w\leq20M_e$), --, therefor.

In Column 18, Line 47, delete "$2M_c$" and insert -- $2M_e$ --, therefor.

Claims

In Column 25, Line 35, in Claim 11, delete "$M_e$" and insert -- $M_c$ --, therefor.

Signed and Sealed this  
First Day of December, 2015

Michelle K. Lee  
*Director of the United States Patent and Trademark Office*